Jan. 31, 1967     C. R. WARD     3,301,650
ANNEALING OF GLASS
Filed Feb. 28, 1962     11 Sheets-Sheet 2
FIG. 2
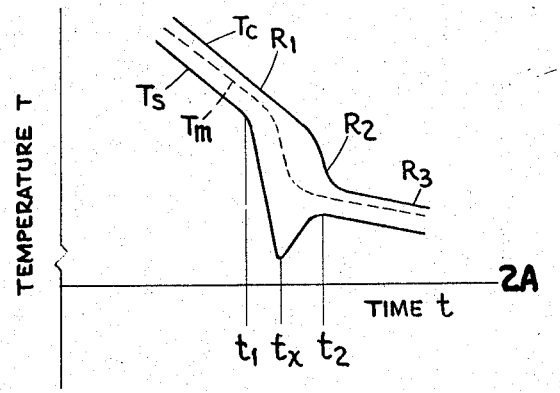
2A
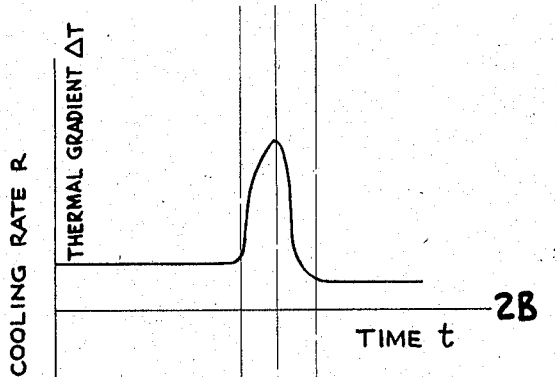
2B
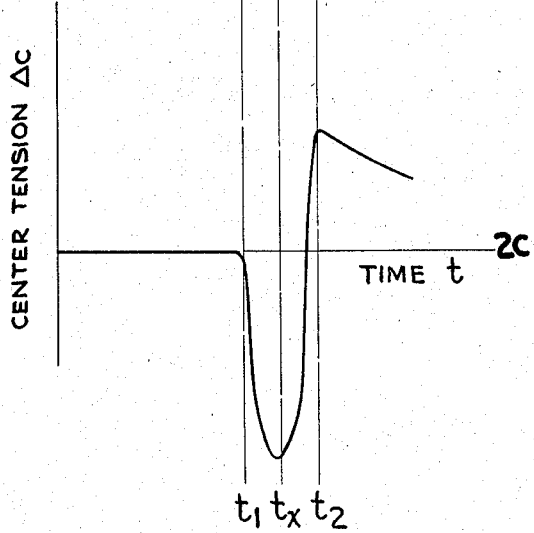
2C
FIG. 3
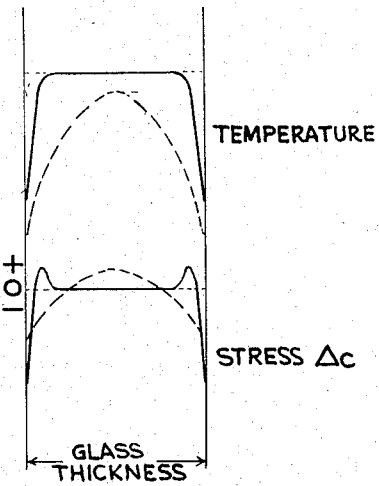
INVENTOR.
CECIL R. WARD
BY Oscar L. Spencer
ATTORNEY Jan. 31, 1967   C. R. WARD   3,301,650
ANNEALING OF GLASS
Filed Feb. 28, 1962   11 Sheets-Sheet 4

INVENTOR.
CECIL R. WARD
BY Oscar L. Spencer
ATTORNEY

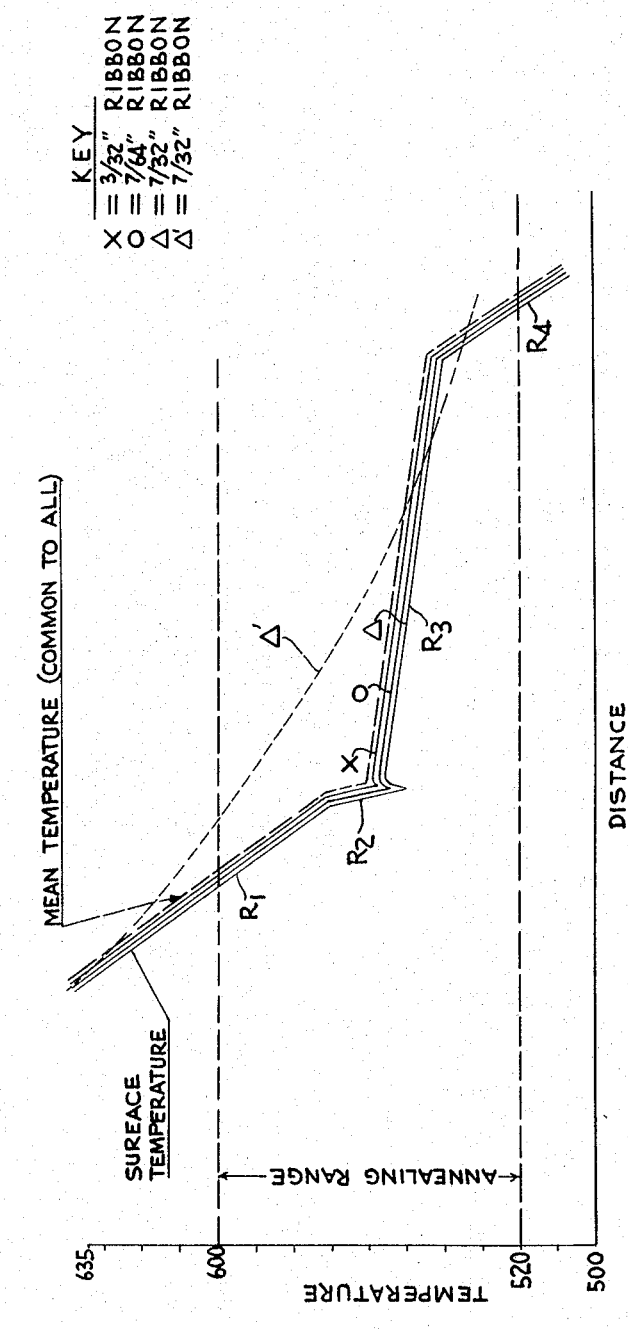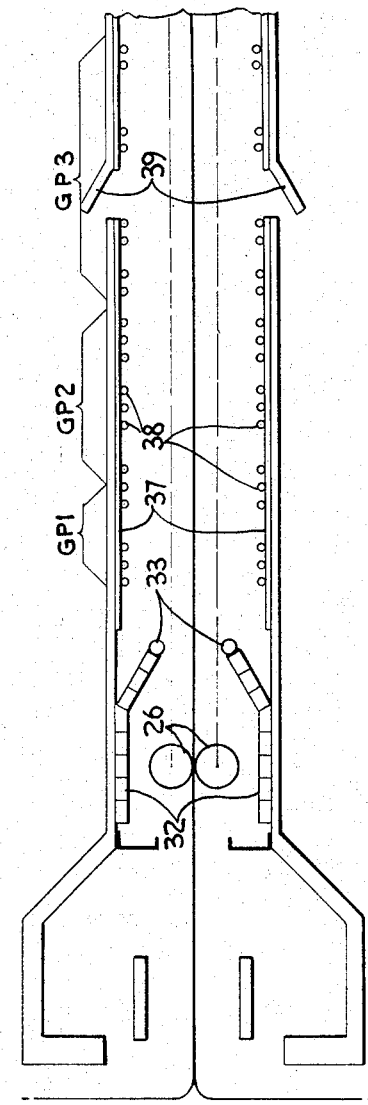
FIG. 6

Jan. 31, 1967   C. R. WARD   3,301,650
ANNEALING OF GLASS
Filed Feb. 28, 1962   11 Sheets-Sheet 6

INVENTOR.
CECIL R. WARD
BY Oscar H Spencer
ATTORNEY

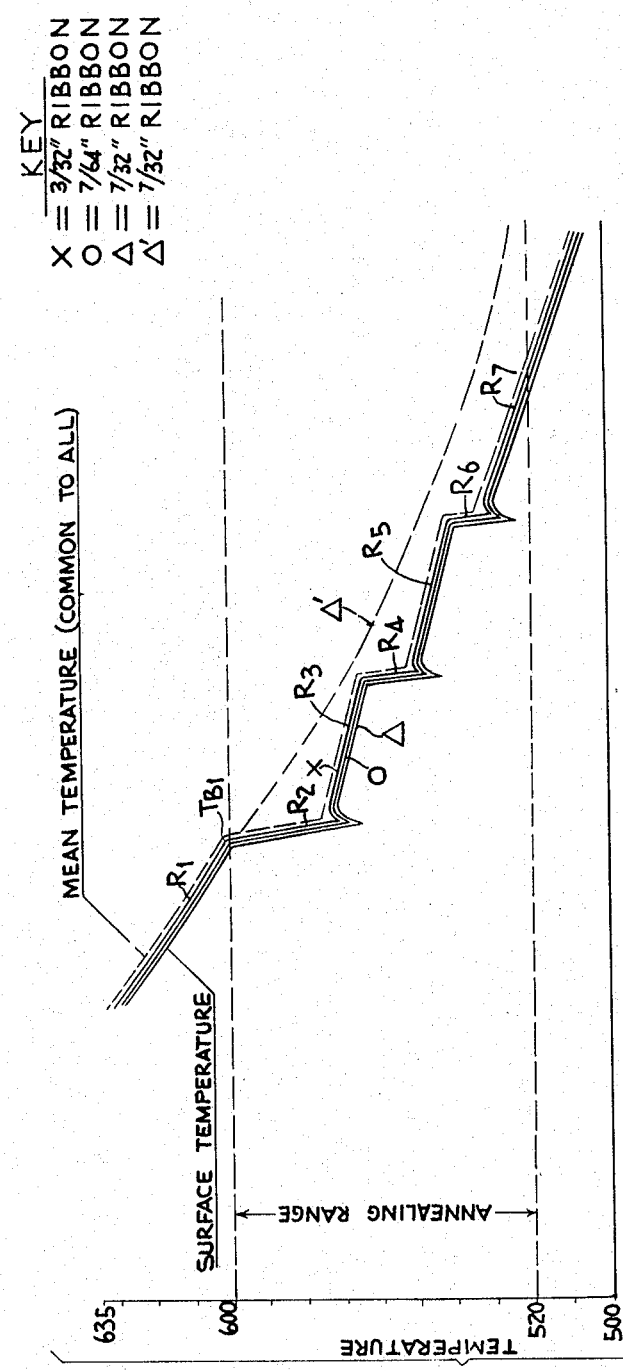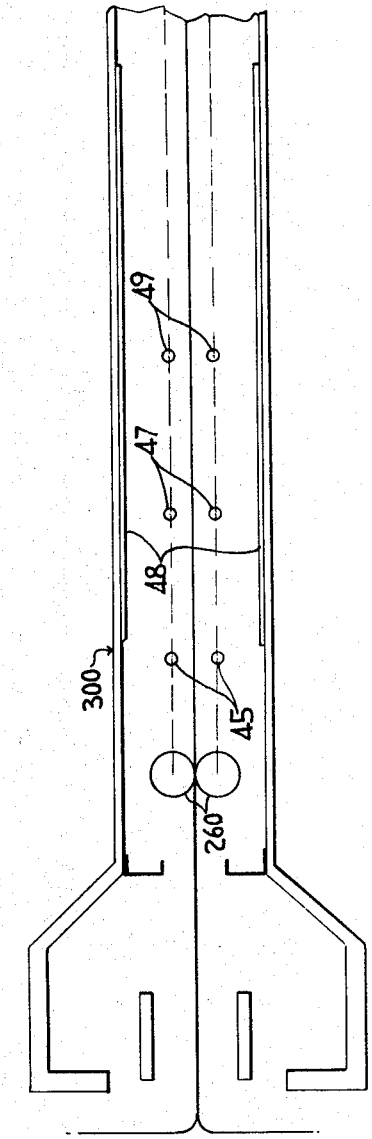
FIG.11

3,301,650
ANNEALING OF GLASS
Cecil R. Ward, Gibsonia, Pa., assignor to Pittsburgh Plate Glass Company, Pittsburgh, Pa., a corporation of Pennsylvania
Filed Feb. 28, 1962, Ser. No. 176,276
7 Claims. (Cl. 65—95)

This invention relates to the annealing of glass and especially to methods for cooling and annealing a continuous glass ribbon in an easily controlled manner and in a relatively short time while achieving low levels of resultant-stress in the finished products.

The necessity for applying a controlled cooling schedule to reduce the stress which appears in glass products as they are cooled from their molten form or from a temperature to which they were heated to relieve existing internal stresses is well recognized. In the production of a continuous glass sheet or ribbon, as by a drawing process, proper annealing is necessary to produce glass which has a substantially uniform overall residual stress pattern and acceptable cutting characteristics. There is an optimum range of residual stress in sheet glass which renders the glass most suitable for cutting. High stress values tend to increase cutting difficulties by increasing the tendency of a running fracture to depart from a score line made by a cutting tool. Stress values which are too low indicate the glass is too well annealed and also make the glass difficult to cut.

Broadly, the process of reducing residual stress involves the cooling of glass, formed from a molten source or heated to a temperature at which existing stresses relax, in a manner such that substantial residual stresses will not reappear when the glass temperature has reached equilibrium. To minimize stress, exact control of temperature is important only during a narrow temperature range—the annealing range. The upper limit of the annealing range is capable of practical definition and determination for a given glass. In general, it is the lowest temperature at which the relaxation of stresses is so rapid that stresses cannot be detected on the time scale of the process being considered. The lower limit of the annealing range is more indefinite but is generally taken as that temperature from which a piece of glass can be quickly cooled without introducing permanent stress. It must be recognized that the temperature limits of the annealing range for a given glass composition are not fixed but, rather, depend upon the annealing time.

Of the known methods of annealing, that procedure developed by Adams and Williamson [1] has heretofore provided the lowest residual stress with the greatest economy of time. Broadly, this has been accomplished by, first, holding or soaking the glass at a constant temperature high in the annealing range for a portion of the annealing time and then cooling the glass from such a high constant temperature to the lower limit of the annealing range at a gradually increasing rate so as to introduce a final permissible stress during the remainder of the available annealing time. The success of this method is dependent upon an accurate computation of the initial annealing temperature selected and the cooling rate, and the cycles must be followed very closely. From a practical standpoint, it is difficult to apply this procedure to a continuous ribbon of glass of substantial width. It necessitates lowering the temperature of the ribbon from the forming temperature to the upper limit of the annealing range rapidly and uniformly, and then holding the temperature constant throughout the area being annealed for the proper length of time.

[1] L. H. Adams and E. D. Williamson, J. Franklin Inst., 190, 597–631 and 835,868 (1920).

U.S. Patents Nos. 2,774,190 and 2,952,097 are examples of the application of the theoretical annealing curve of Adams and Williamson to an industrial process of glass drawing. These patents indicate the necessity of maintaining a relatively high temperature of the glass for a substantial proportion of the annealing range and for accurately controlling the cooling curve through the annealing range.

A proposed new method for annealing glass has been disclosed and claimed in the co-pending application of R. Gardon, Serial No. 170,989, filed February 5, 1962, now U.S. Patent No. 3,251,671, assigned to the assignee of the present application. The annealing schedules proposed in the above-mentioned application have eliminated the necessity for maintaining the glass at a high constant temperature through a part of the annealing range and do not require cooling the glass through the annealing range at progressively increasing cooling rates which are difficult to control and duplicate. Broadly, this has been accomplished by a process in which glass is cooled through the annealing range in a plurality of different rates in a manner which induces instantaneous stresses within the glass and which utilizes the relaxation of at least some of the stresses to diminish the final permanent stress in the glass. Preferably, the temperature of the glass is first lowered at a substantially constant rate from a temperature above the annealing range to a temperature within the upper portion of the annealing range, whereupon the rate of cooling is diminished. The diminished rate may either be continued through the lower temperature limit of the annealing range or may be increased to a third cooling rate at a second temperature within the annealing range, which third rate is then continued through the lower limit of the annealing range. Through optimization of cooling rates for any given annealing range, as described more fully in the above-mentioned co-pending application, it is possible by the use of the above process to achieve low levels of permanent stress in glass in a more easily controlled and economical manner than heretofore possible.

According to the present invention, there has been provided a novel improvement in the method of annealing which may not only be applied to the methods and apparatus of annealing as disclosed in the above-mentioned co-pending application to improve the resultant anneal achieved thereby, but which also provides a new annealing schedule which will permit the attainment of lower levels of residual stress, particularly in flat glass produced by the continuous process, than has been possible by other cooling schedules when applied under comparable circumstances.

Basically, low levels of residual stress are achieved according to the present invention by lowering the temperature of the glass through portions of the annealing range at high rates of cooling of a sufficiently short time duration that the dominant response of the glass remains essentially elastic during this step. Thus, the stress induced by the change to a high cooling rate disappears with the removal of the high cooling rate, there being insufficient time during the process for substantial stress relaxation to take place.

More specifically, methods and apparatus have been developed which lower the residual stress of glass annealed through a cooling schedule involving two or more constant cooling rates, as disclosed in the aforementioned co-pending application, Serial No. 170,989, by impinging a flow of air upon that portion of the glass which is at that temperature in the annealing schedule where the rate of cooling is diminished. According to a further embodiment an entirely new annealing schedule has been developed in which the temperature of glass is lowered through the annealing range in a plurality of rapid temperature drops of short duration separated by relatively low cooling rates of substantially longer time duration, as by impinging cooling air or other inert gaseous fluid upon the glass surface at spaced time intervals or continuously in narrow bands at spaced positions relative to a moving ribbon of glass during the annealing schedule.

Advantages attendant upon the annealing schedules of the present invention, in addition to the improved anneal, include the relatively low cost of following a cooling schedule in which the glass is constantly cooled, as against one in which the temperature must be maintained at a high level for a substantial portion of the annealing time; the ease with which substantially linear cooling rates may be established and rapid quenching of the glass accomplished; and the reduction of the susceptibility of the glass to roll marking or other surface deformation by virtue of the initial lowering of the temperature.

Other attendant advantages of this invention will be more readily appreciated as the same becomes better understood by reference to the following detailed description when considered in connection with the accompanying drawings in which:

FIG. 2 shows more detailed graphs of partial temperature curves of the center plane, surface and mean temperatures (FIG. 2A), corresponding curves of the cooling rate and temperature gradient (FIG. 2B), and the center tension (FIG. 2C) of a glass plate undergoing a rapid cooling for a short period of time.

FIG. 3 diagrammatically indicates temperature and stress distributions through the thickness of a glass plate as a cooling gradient is established.

Figure 4:
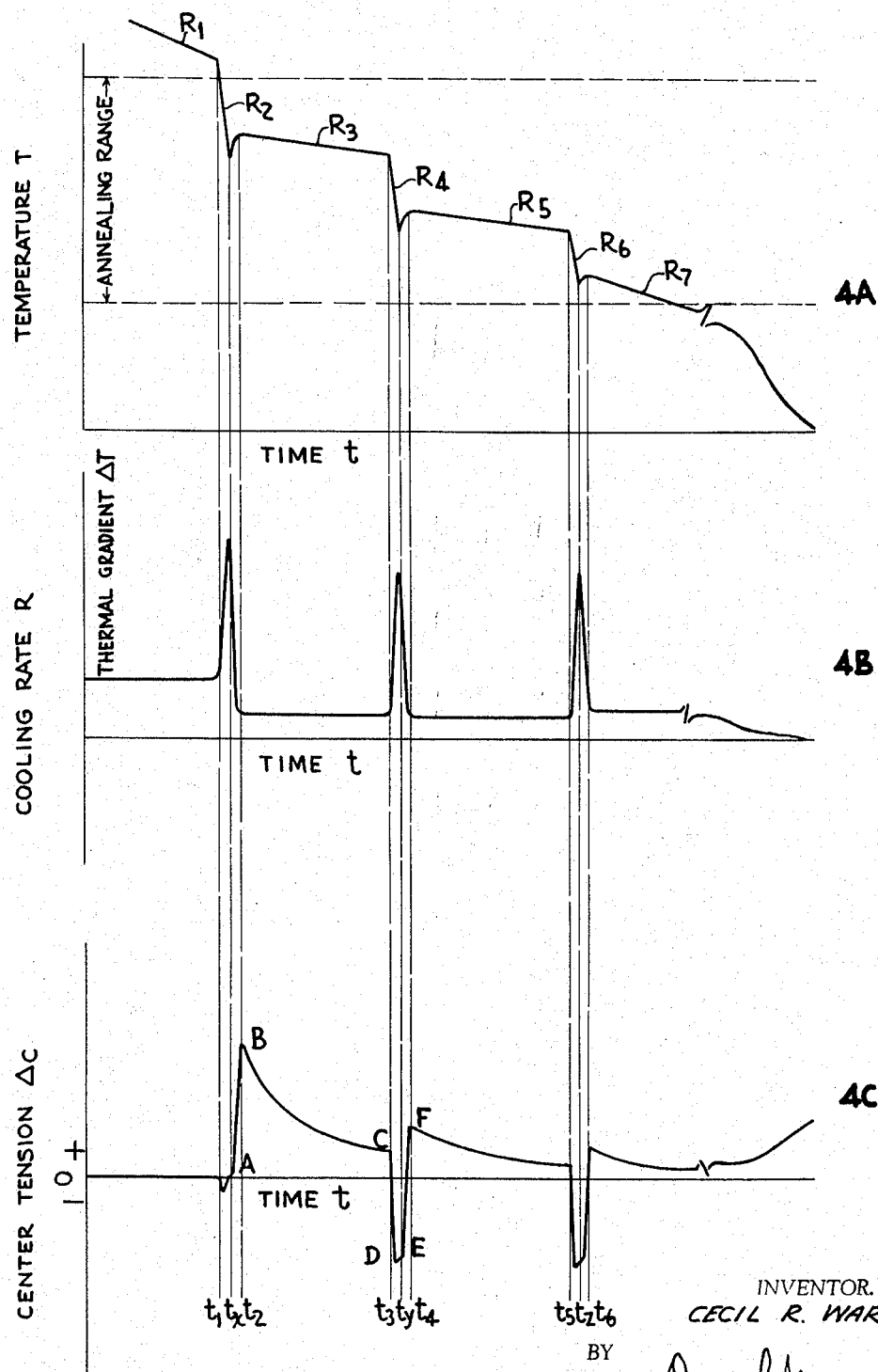

FIG. 4 shows a series of three graphs for a cooling schedule of a second embodiment of the present invention in which the temperature (FIG. 4A), the cooling rate and the temperature gradient (FIG. 4B), and the center tension (FIG. 4C) are plotted on a common time scale.

Figure 5:
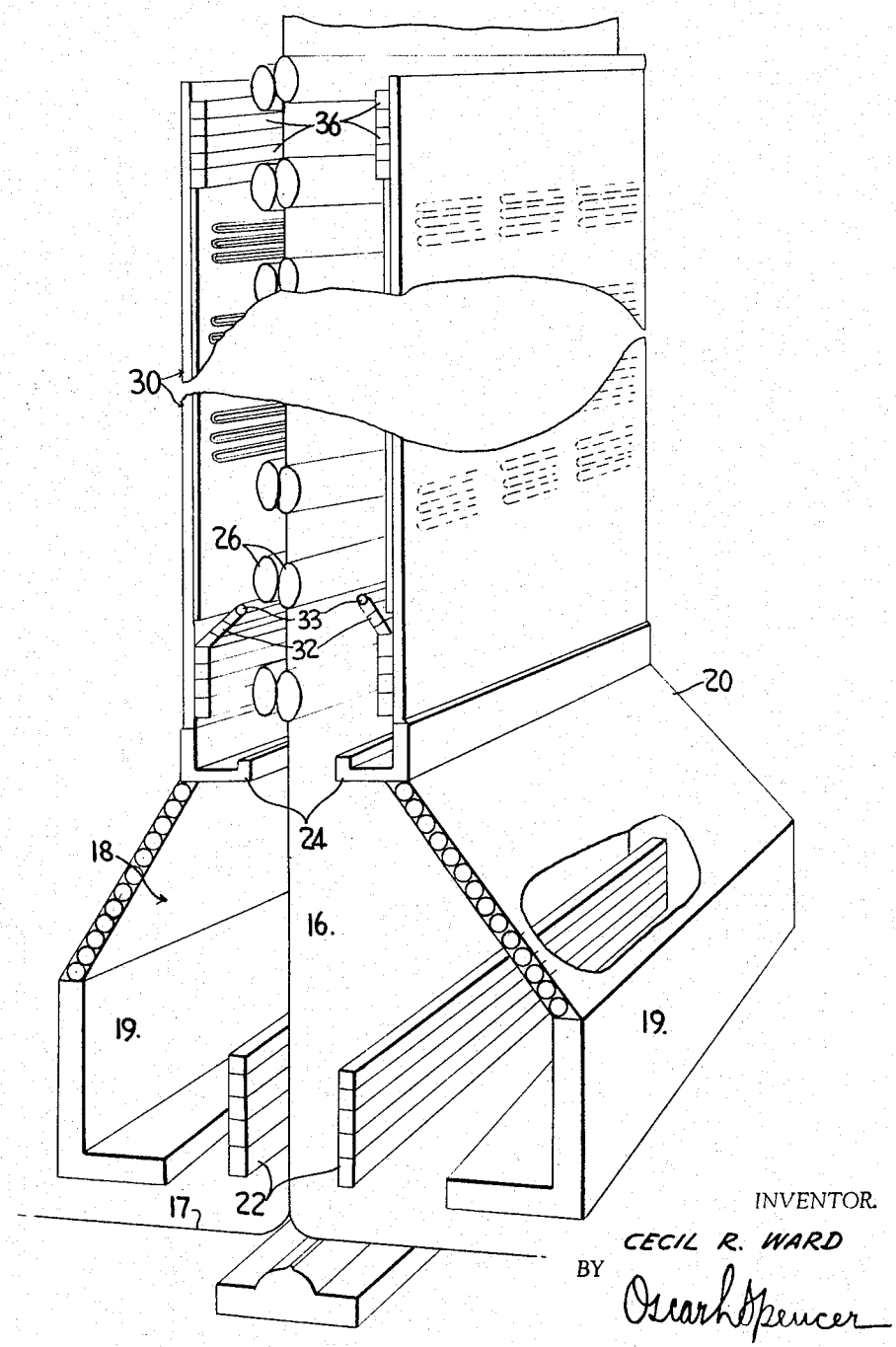

FIG. 5 is a schematic, perspective view of a glass drawing machine illustrating a first embodiment of the present invention.

FIG. 6 is a chart showing a cooling curve of a first embodiment of the invention for vertically drawn sheet glass wherein the temperatures of different thicknesses of glass ribbons having identical mean temperatures are compared with their vertical positions in a schematically shown, vertically disposed lehr during the upward travel of each ribbon.

Figure 7:
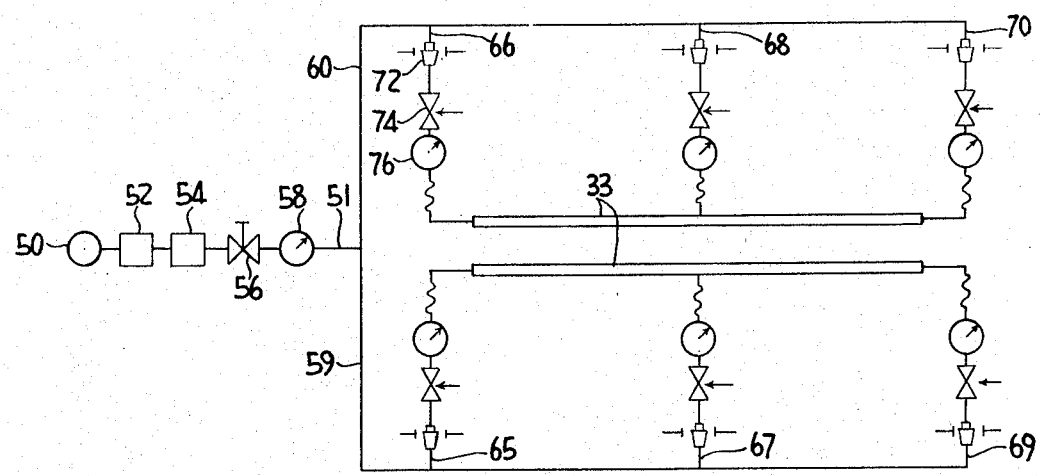

FIG. 7 schematically shows a suitable air supply system for the air manifolds used in the present invention.

Figure 8:
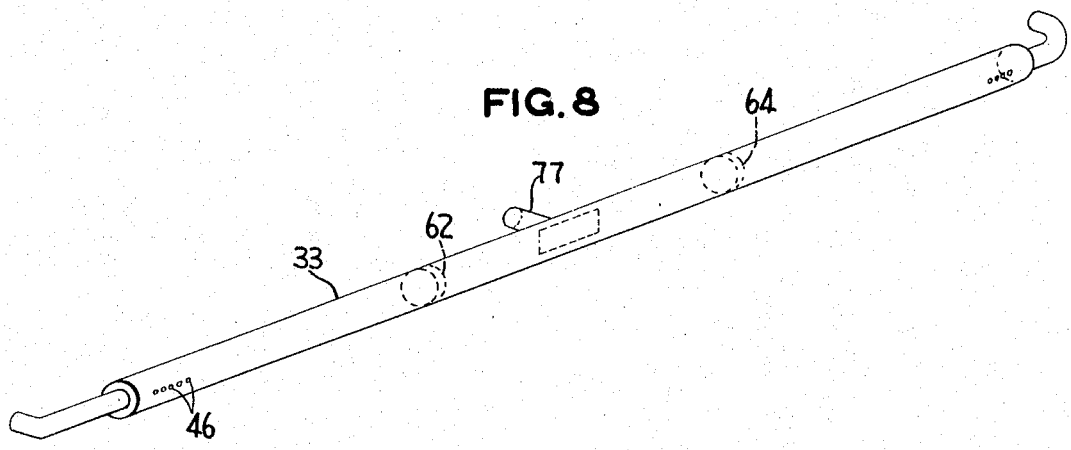
Figure 9:
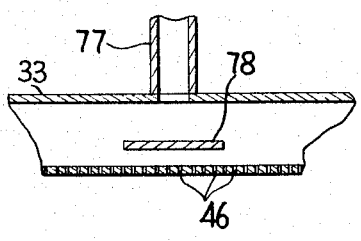

FIGS. 8 and 9 show structural details of air manifolds.

Figure 10:
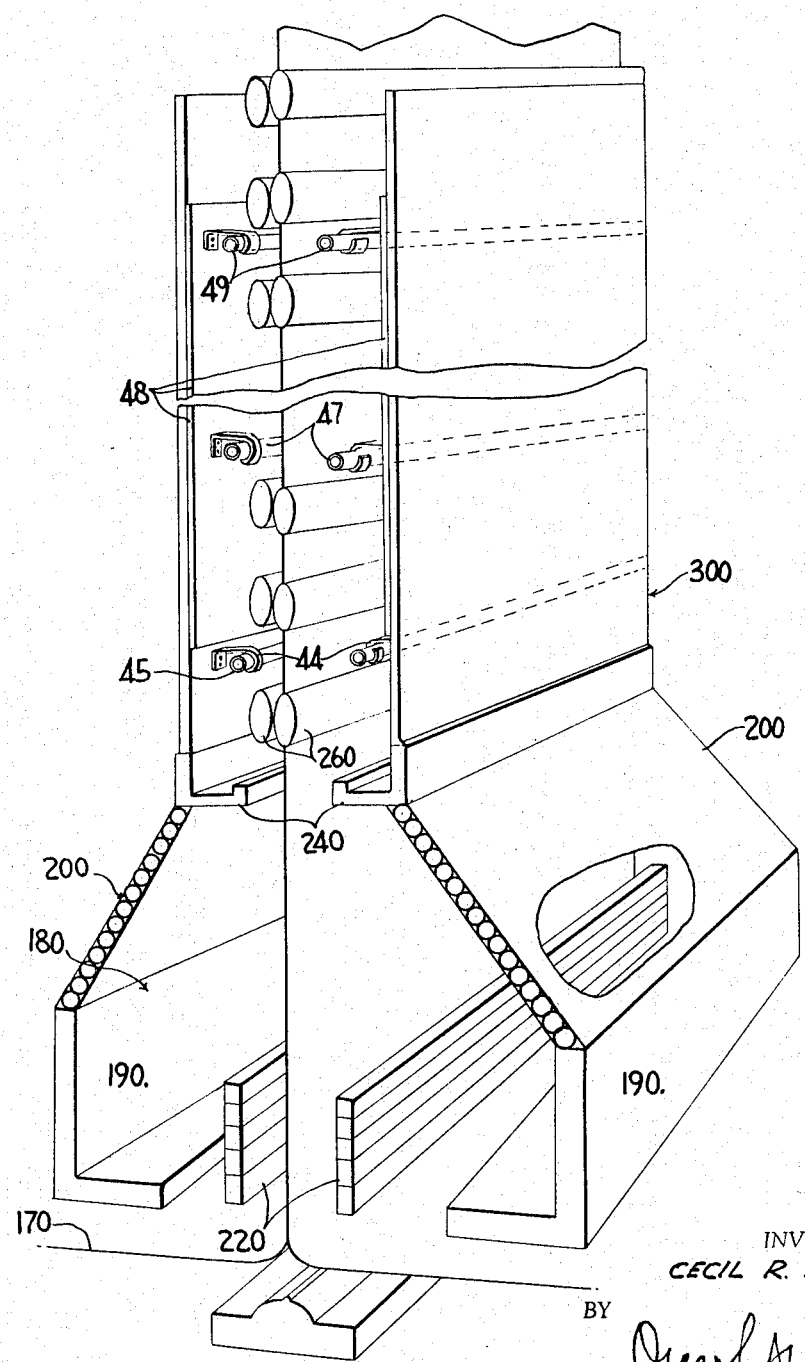

FIG. 10 is a schematic, perspective view of a glass drawing machine illustrating a second embodiment of the invention.

FIG. 11 is a chart showing cooling curves of a second embodiment of the invention for vertically drawn sheet glass wherein the temperatures of different thicknesses of glass ribbons having identical mean temperatures are compared with their vertical positions in a schematically shown, vertically disposed lehr during the upward travel of each ribbon.

Figure 12:
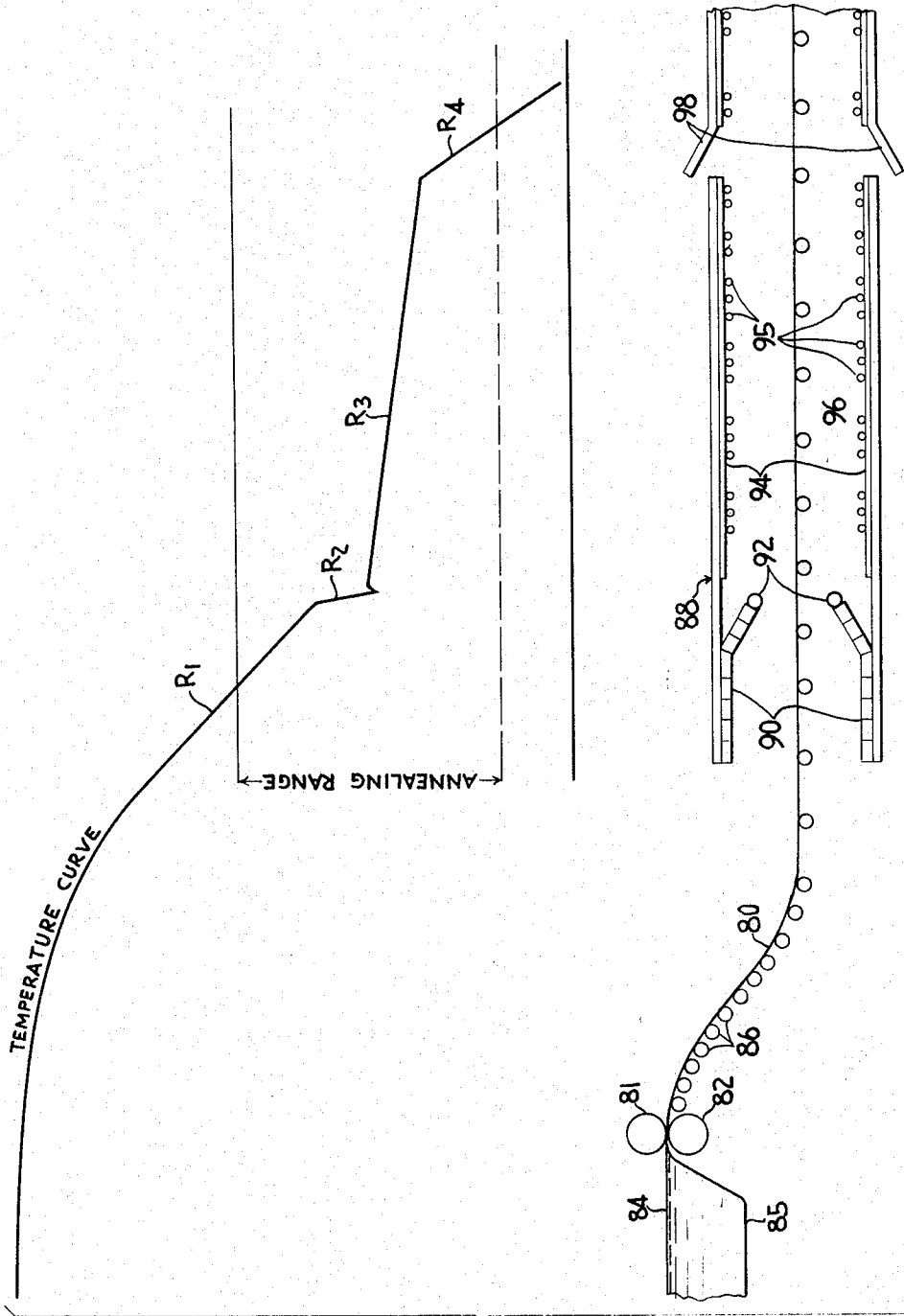

FIG. 12 is a chart showing a cooling curve of the type disclosed in the first embodiment of the present invention as applied to horizontally rolled glass wherein the temperature of the glass ribbon is compared with its horizontal position in a schematically shown, horizontally disposed lehr during the travel of the ribbon.

Figure 13:
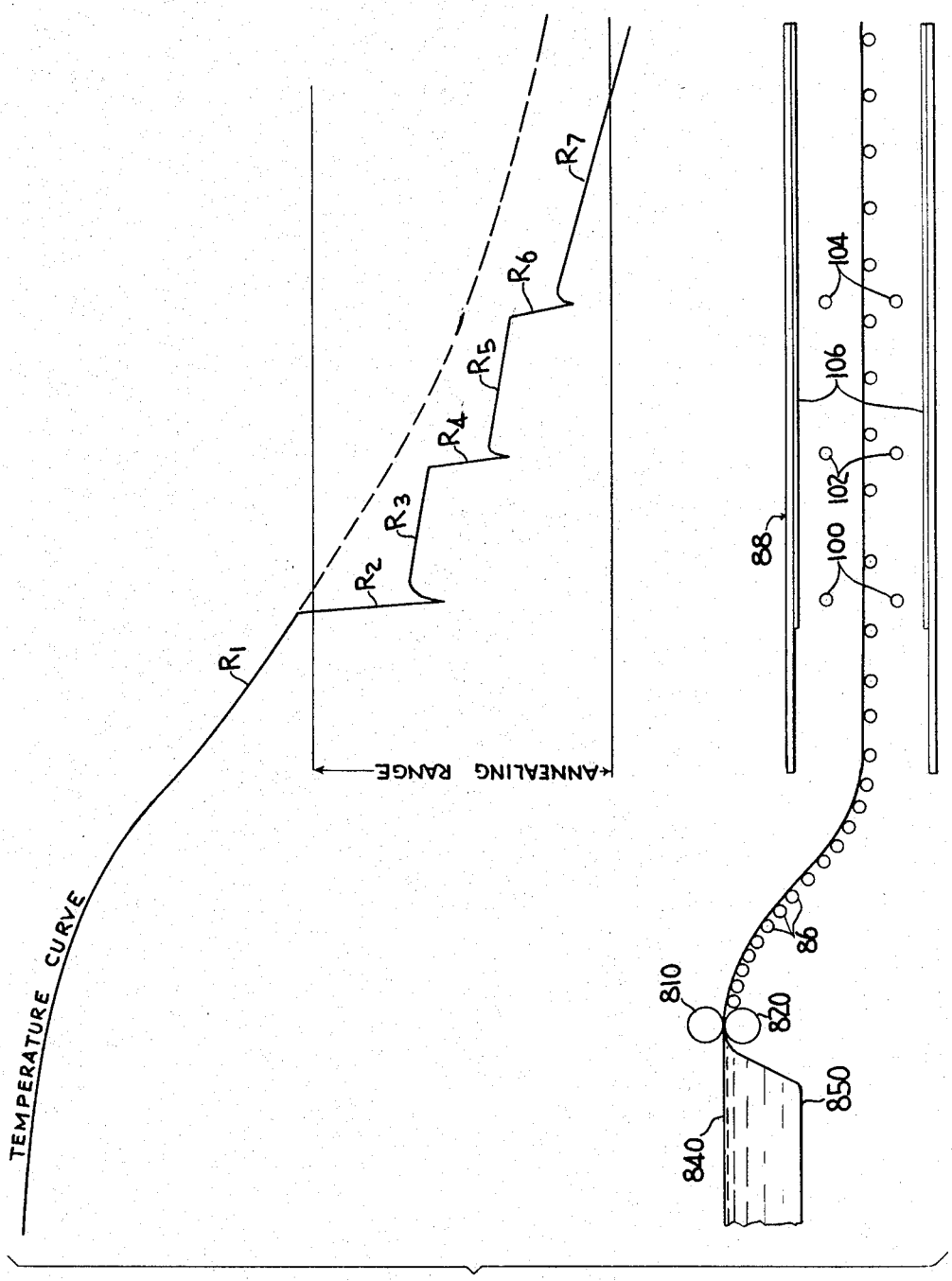

FIG. 13 is a chart showing a cooling curve of the type disclosed in the second embodiment of the present invention as applied to horizontally rolled glass wherein the temperature of the glass ribbon is compared with its horizontal position in a schematically shown, horizontally disposed lehr during the travel of the ribbon.

Figure 14:
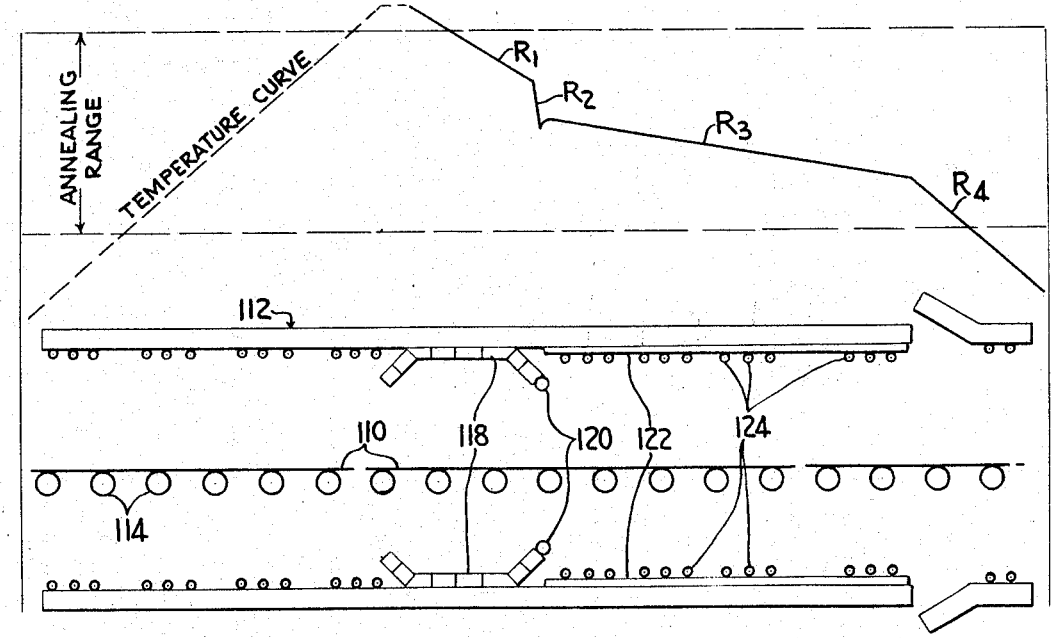

FIG. 14 is a chart showing a cooling curve of the type disclosed in the first embodiment of the present invention as applied to a lehr for reannealing glass sheets or plates, either flat or curved, wherein the temperature of the glass is compared with its position in a schematically shown, horizontally disposed lehr during the travel of the glass.

Figure 15:
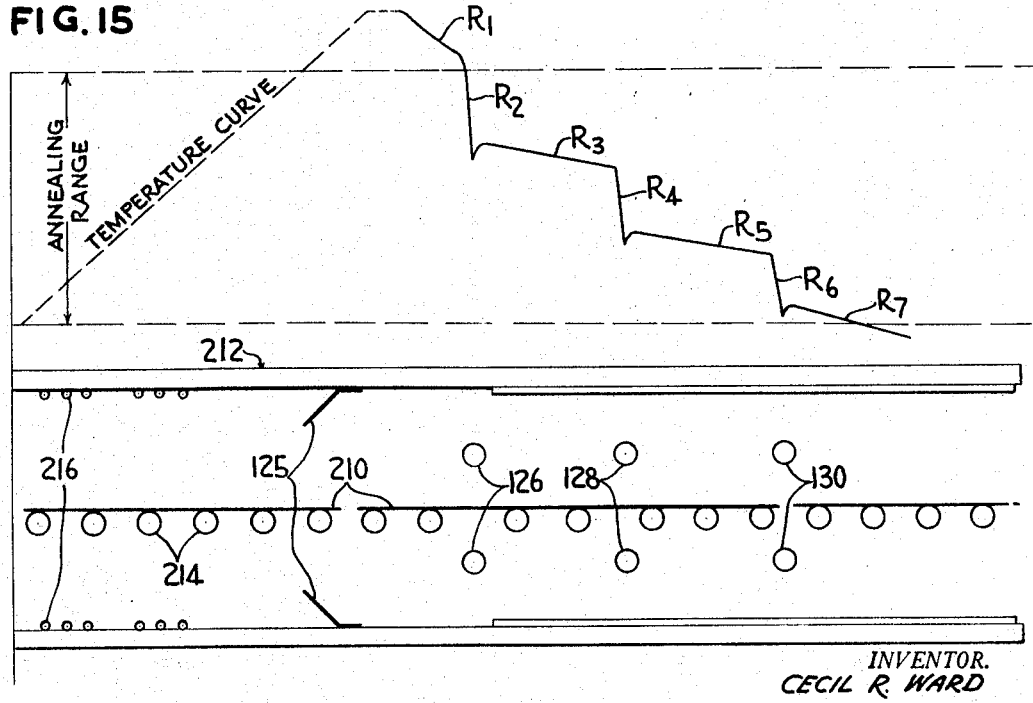

FIG. 15 is a chart showing a cooling curve of the type disclosed in the second embodiment of the present invention as applied to a lehr for reannealing glass sheets or plates, either flat or curved, wherein the temperature of the glass is compared with its position in a schematically shown, horizontally disposed lehr during the travel of the glass.

As an aid to the understanding of the present invention, the following excursus on the mechanism of stress generation and relaxation in glass should be helpful:

The final residual permanent stress in glass which has been cooled from a temperature above the annealing range of the glass is a function of both the temperature distribution in the glass between the surface portions and the interior thereof at temperatures above the annealing range and the relaxation of instantaneously existing stresses occurring within the annealing range as the glass is cooled. If a cooling temperature gradient from exterior to interior of the glass is impressed upon a plate of glass at a temperature above the annealing range, any stress created will instantaneously relax because the glass is too fluid to support a stress, and thus the glass will be stress free. As long as the glass is continuously cooled through the annealing range at this constant temperature gradient, no stress will be created and, hence, there is none to relax. As the temperature of the glass approaches room temperature and the magnitude of the cooling temperature gradient is reduced, a final permanent stress will appear in the glass which is proportional to the temperature gradient which was maintained through the annealing range. If, instead of continuing the original gradient throughout the annealing range, the gradient is changed at some point within the annealing range to a second temperature gradient, as by cooling the glass more or less rapidly than originally, an instantaneous stress will be produced. If this second gradient is then maintained to cool the glass through the remainder of the annealing range, the instantaneous stress induced by the change in cooling rates will relax through viscous flow of the glass until the temperature of the glass reaches the lower limit of the annealing range. The final permanent stress will now be proportional to the original cooling rate minus or plus that portion of the instantaneously induced stress which has relaxed during the time the second cooling rate was maintained within the annealing range (minus or plus, depending upon whether the relaxation was helpful or harmful in achieving a low final stress). Relaxation of stress under such circumstances may be either helpful or harmful, depending upon whether the change in thermal gradients is toward a lower cooling rate or a higher cooling rate, respectively. That is, if the glass by virtue of the change in cooling rate adjusts, through the viscous flow which relaxes the stress, toward a condition which more closely approaches the isothermal condition at room temperature, such an adjustment will diminish the permanent stress which appears when the temperature gradient is removed. On the other hand, if the adjustment of the glass to the second temperature gradient results in a change toward a condition further removed from the isothermal room temperature condition that will finally exist, as by changing to a higher rate of cooling, this adjustment will increase the final permanent stress which appears in the glass.

Figure 1:
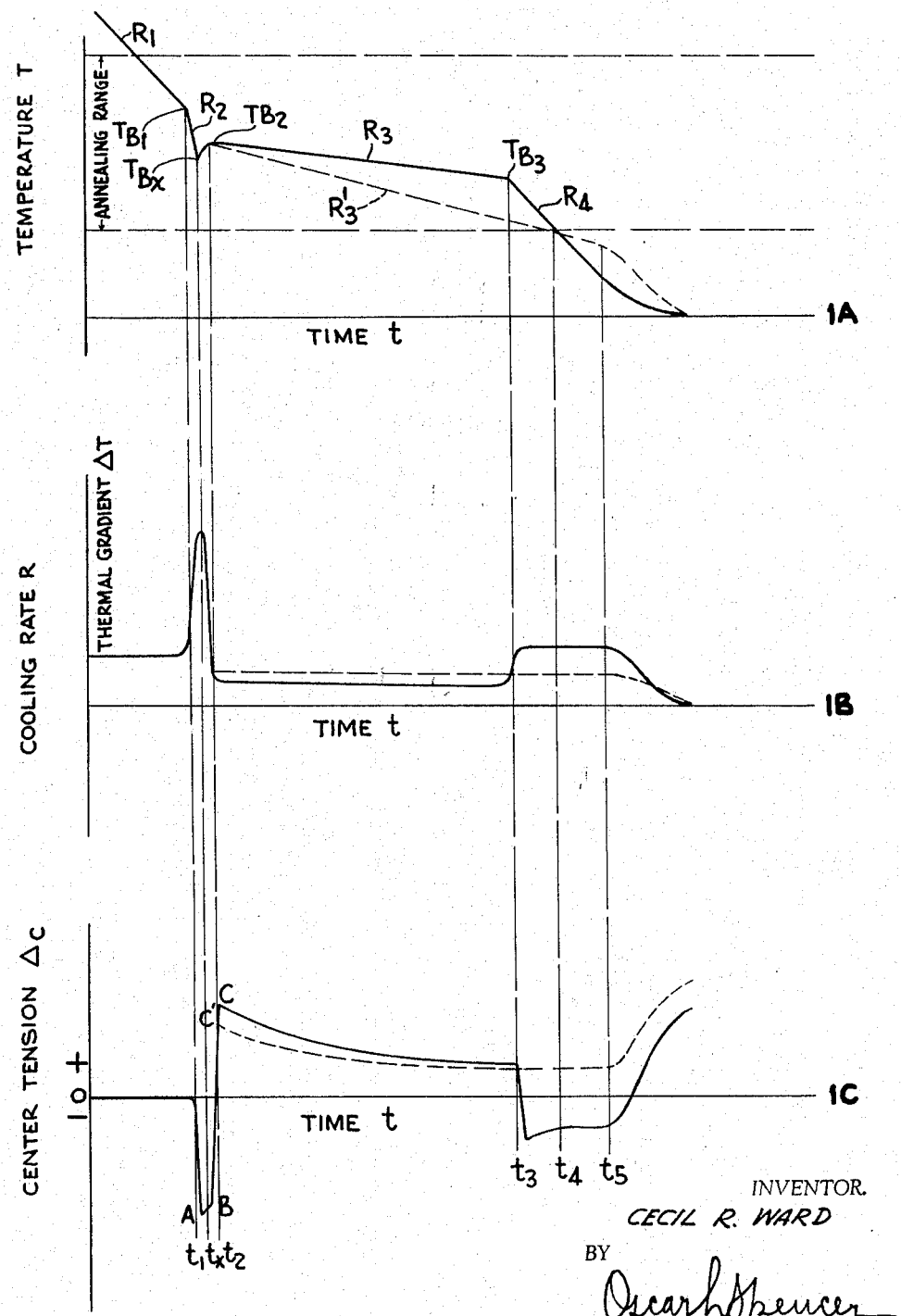
FIG. 1 shows a series of three graphs for a cooling schedule of a first embodiment of the present invention in which the temperature (FIG. 1A), the cooling rate and the temperature gradient (FIG. 1B), and the center tension (FIG. 1C) are plotted on a common time scale.

With the above approach to stress generation and relaxation providing a background, the annealing schedules of the present invention, in which the effects of transient changes in temperature and stress distributions play an important part, may be best understood first with reference to FIGS. 1 to 3.

FIG. 1 is composed of a series of three graphs depicting, in accordance with the present invention, an annealing schedule of a plate of glass in terms of the surface temperature T (FIG. 1A), the rate of cooling R and the temperature gradient ΔT between the center and surfaces of the plate (FIG. 1B), and the instantaneously existing stress in terms of center tension expressed in central birefringence $\Delta_c$ (FIG. 1C), all plotted against a common time scale. The time scale of these graphs has been sufficiently extended to include the effects of the transient temperature and stress distributions which affect the annealing schedule. FIGS. 2 and 3, in particular, illustrate the changes in temperature and stress distributions during the short period of time in which the glass is rapidly cooled, as by air impingement, and in which transient conditions must be considered.

With reference now to FIG. 1A, an annealing schedule is illustrated in which the glass is cooled from above the annealing range to a temperature $T_{B_1}$ within the annealing range at a first rate $R_1$. Thereafter, the surface of the glass is rapidly cooled for a short time to a temperature $T_{BX}$ within the annealing range at a second rate $R_2$. Upon the change from cooling rate $R_2$ to rate $R_3$ or $R_3'$, the surface temperature immediately rises due to the flow of heat from the inside of the glass sheet toward the cooler surface. A stabilized temperature $T_{B_2}$ is reached at time $t_2$. The cooling rate $R_3'$ may be established and continued to the lower limit of the annealing range, as shown in dotted line or, preferably, the cooling rate $R_3$ may be established which is of a magnitude that necessitates a change to an increased rate $R_4$ at a temperature $T_{B_3}$ within the annealing range to bring the temperature of the glass to the lower limit of the annealing range in a predetermined annealing time.

FIG. 1B shows the changes in the temperature gradient ΔT and the cooling rate R, and FIG. 1C shows the instantaneous stress in terms of center tension $\Delta_c$ which corresponds to the annealing schedule shown in FIG. 1A. The dotted line portions correspond to the dotted line cooling in FIG. 1A. A correlation of the stress graph of FIG. 1C with the graphs of FIGS. 1A and 1B indicates that no stress exists in the glass as long as the thermal gradient, and thus the cooling rate, established above the annealing range remains constant. The sharp increase in cooling rate at time $t_1$ caused, for example, by the impingement of air upon the glass creates a corresponding stress which is shown in the direction of increased center compression (decreased center tension). Because the stress is shown on a time scale which reveals the transient effects of the temperature and stress distributions upon the glass, the existing stress is not accurately characterized by a single parameter, such as the instantaneously existing center tension $\Delta_c$, which would be representative of proportional stress changes throughout the thickness of the plate. This may be better understood with reference to FIGS. 2 and 3 of the drawings.

The dotted line curve $T_m$ in FIG. 2A shows the path of the mean temperature of that portion of the curve of FIG. 1A between times $t_1$ and $t_2$. Plots of the surface temperatures and center temperatures of the glass plate are shown by the solid line curves $T_s$ and $T_c$, respectively. The lines are first shown parallel, indicating a thermal gradient in equilibrium. At time $t_1$ the glass which is being cooled at rate $R_1$ is rapidly cooled, as by impinging air upon the surfaces, for the short interval of time $t_1$ to $t_x$. At time $t_1$ the surface temperature of the glass plate rapidly decreases but, as yet, the center temperature is not affected. At about time $t_x$ the center temperature begins to decrease at a rapid rate and continues to rapidly decrease until time $t_2$. From time $t_x$ to time $t_2$ the surface temperature increases on the order of one-half of the magnitude of the decrease during rapid cooling.

Thus, at time $t_2$ an equilibrium state is reached which is indicated by the parallel temperature curves of the graph at a slope determined by the cooling conditions which establish the decreased cooling rate $R_3$. It should be noted that the cooling rate $R_3$ begins at a temperature substantially displaced from the temperature prior to the impingement of the air. As is indicated in FIG. 6, this may well be a magnitude of about 15 degrees centigrade. The graph of FIG. 1C schematically indicates that this decrease in temperature has been accomplished at the expense only of the amount of stress (indicated by the difference in stress values of A and B) which has relaxed between times $t_1$ and $t_2$. However, as shown more accurately in the detailed curve of FIG. 2C, the stress relaxation during a changing temperature gradient cannot actually be separated from the change in stress caused by the removal of the rapid cooling temperature gradient. The decrease in temperature at the point of origin of rate $R_3$ (FIG. 1A) reduces the slope of rate $R_3$ which is necessary to lower the temperature of the glass to a given temperature, such as $T_{B_3}$, and therefore the stress relaxes during this cooling rate toward a more isothermal condition. Alternatively, if the slope of $R_3$ is not reduced, the lower point of origin permits the lower level of the annealing range to be reached in a shorter annealing time.

FIG. 3 of the drawings schematically shows the effect of external cooling upon a plate of glass initially isothermal and at a temperature within and near the upper limit of the annealing range. The temperature and corresponding stress distributions indicated in solid line depict conditions at the beginning of the transition from an isothermal gradient shown in broken line to the equilibrium state, parabolic distributions, shown in dotted line. Because the response of the temperature distribution within a moderately thick glass plate to a change in its thermal environment is relatively rapid, the elapsed time from the isothermal condition, through the solid line example of a transitional gradient, to the dotted line equilibrium temperature and stress distributions shown is quite short relative to the time needed to anneal the glass. For example, a 3 millimeter-thick plate will attain its new, equilibrium state, temperature distribution within approximately 2 seconds, and a 6 millimeter plate in about 8 seconds.

The solid line temperature distribution curve in FIG. 3 indicates that the initial effect of the external cooling is to lower the surface temperature of the plate without affecting the temperature in the central portion. Correspondingly, the solid line stress distribution curve shows that only the cooled surface portions of the plate are under stress. This is true because at the elevated temperature of the glass, the central portion of the plate is still too fluid to support a stress. Hence, the total stress in the glass remains low, and there will be very little stress relaxation. If the cooling gradient is maintained, the stress produced by the establishment of the gradient will reach equilibrium and, because of the increased magnitude, begin to relax at a substantial rate through viscous displacement of the glass. Relaxation continues as long as the gradient is maintained and the temperature of the glass stays within the annealing range. However, if the rapid cooling is reduced to a lower rate before the temperature and stress distributions corresponding to the increased cooling rate reach an equilibrium condition, the stress caused by the change to rapid cooling will disappear as a result of the reduction in cooling rate before substantial relaxation occurs. Some stress, of course, does relax even during this short time. The amount, however, is small, not only because of the short time but also because the rate of stress relaxation is kept low by virtue of the low absolute stress level in the glass which results from the inability of the less viscous central portion of the plate to support a stress. It can be seen, therefore, that the rapid cooling for times somewhat less than those necessary to establish a steady-state distribution through the thickness of the glass lowers the temperature of the glass without creating a substantial amount of permanent residual stress.

Reference is again made to FIG. 1C wherein, for convenience, average stress values through the glass thickness have been plotted during transition periods from one cooling rate to another. As previously mentioned and for the reasons just explained, these portions of the graph do not indicate the stress value as characterized by the center tension in the plate as do the other portions of the graph. As a result, the curve is, in part, somewhat distorted but, nevertheless, will aid in an understanding of the changes in stress produced by the cooling schedule.

The stress, indicated at zero for that portion of the cooling schedule during which the gradient established above the annealing range remains constant, will, from time $t_1$ to time $t_2$, change with the temperature gradients resulting from the application and removal of the rapid external cooling. The elapsed time for this step is sufficiently short that the glass, even though it is within the annealing range, has insufficient time to relax through viscous flow a substantial portion of the induced stress. The actual amount which relaxes is indicated schematically by the difference in stress values at A and B in FIG. 1C. At time $t_x$ the cooling rate is changed to $R_3$, and the change in the temperature gradient from that which established rate $R_2$ to that which establishes $R_3$ causes a stress in the direction of increased center tension. This change removes the amount of center compression stress indicated at B existing in the glass at the time $t_x$ when the cooling rate is diminished and, by virtue of the extent of the reduction in cooling rate from $R_1$ to $R_3$ plus the amount of stress which has relaxed from A to B, produces an instantaneously existing center tension stress of a magnitude indicated at C at time $t_2$. Thus, comparing graphs 1A and 1C, it can be seen that the temperature drop in the glass from $T_{B_1}$ to $T_{B_2}$ was accomplished at the expense of only the small amount of stress which relaxed from time $t_1$ to time $t_2$. The actual stress values at points A, B and C indicate only temporary stresses and have no effect upon the final permanent stress in the glass, except to the extent that they relax through viscous flow of the glass. The stress existing at time $t_2$, as indicated at C for the ideal curve or C' for the dotted line simplified curve, relaxes during the application of cooling rate $R_3$ or $R_3'$ in a direction which decreases the center tension in the glass until, as shown in dotted lines, the temperature of the glass reaches the lower limit of the annealing range or, as shown in solid line, until the cooling rate is again changed at time $t_3$. Because a change at time $t_3$ is to an increased temperature gradient, the induced stress is in the direction of decreased center tension (increased center compression) and, as the graph in FIG. 1C shows, any stress relaxation from time $t_3$ is in the direction of increased center tension and increases the residual stress. However, the amount of stress that relaxes is small because the temperature of the glass is relatively low in the annealing range (thus the rate of relaxation is low) and the increased rate of cooling, $R_4$, lowers the temperature of the glass to below the annealing range very quickly, thereby limiting the time during which the stress can relax. Once the temperature of the glass reaches the lower limit of the annealing range at time $t_4$, the glass may be considered an elastic material, and the decrease in ΔT from time $t_5$ until isothermal room temperature conditions are reached results in an increase in stress which is the final permanent residual stress produced in the glass by the thermal history. This stress is equivalent to the stress which would result from cooling the glass through the annealing range at the first rate $R_1$ plus the amount of stress which relaxes during rates $R_2$ and $R_4$, minus the amount of stress which relaxes during rate $R_3$. It should be emphasized at this point that the substantial temperature drop from $T_{B_1}$ to $T_{B_2}$ at the expense of increased final stress due to stress relaxation between times $t_1$ and $t_2$ allows rate $R_3$ to be reduced to an extent which increases the helpful stress relaxation (in the direction of decreased center tension) to more than compensate for the small increase in final stress contributed by the stress relaxation between times $t_1$ and $t_2$. This is because the glass is not given time to adjust through viscous displacement to the rapid cooling rate $R_2$ and, therefore, the temperature drop resulting from this cooling rate is achieved without a proportional change in the stress curve.

In addition to the annealing schedule just described, the principles of the present invention have made possible an entirely new annealig schedule which may be best understood in connection with FIG. 4. FIG. 4 is composed of three graphs, 4A in which the temperature of a glass plate undergoing a cooling process in accordance with the present invention is plotted against time, 4B in which the cooling rates R and the temperature gradients ΔT between the center and the surface of the glass plate are plotted against time, and 4C in which the instantaneously existing stress in the glass in terms of center tension $Δ_c$ is plotted against time. As in the graphs of FIG. 1, the time scale is sufficiently expanded to reveal transient responses from the changes in the cooling schedule. For this reason, as explained in connection with FIG. 1, those portions of the graph corresponding to the transient changes do not accurately indicate the value of the parameter being plotted but nevertheless aid in an understanding of the annealing schedule. As shown in FIG. 4A, the glass, cooling at its natural cooling rate $R_1$, is impinged with air from time $t_1$ to time $t_x$ so that it is cooled from a temperature above the annealing range to a temperature high within the annealing range at a very rapid rate $R_2$ in a very short period of time $t_1$ to $t_2$. At time $t_2$ the glass is cooled at a much reduced rate $R_3$ which is substantially less than the normal cooling rate of the glass and, in fact, may approximate holding the glass at a constant temperature. This step is repeated twice within the annealing range in the example shown; i.e., the glass is rapidly cooled, as indicated by rate $R_4$, then cooled very slowly at rate $R_5$, again rapidly cooled at rate $R_6$ and cooled slowly at rate $R_7$ through the lower limit of the annealing range. The actual number of steps used is, in part, a matter of practical considerations. However, the primary factor limiting the minimum number of steps is the limit of the temperature drop which can be achieved within a period of time short enough to prevent stress relaxation. Generally speaking, this means a maximum time of about one-half of the time it takes to establish an equilibrium-state gradient in the glass.

Correlating the curves of FIGS. 4A and 4B with the stress curve of FIG. 4C, it can be seen that there is no stress during the cooling rate $R_1$ which was established above the annealing range. At time $t_1$ the stress created by the change from rate $R_1$ to rate $R_2$ substantially instantaneously relaxes because the glass is too fluid to support a stress. Hence, the change in cooling rates results in an instantaneous relaxation of the glass to a condition corresponding to that of the rapid cooling rate $R_2$. Of course, if this rate were continued through the annealing range there would be no stress relaxation, but, upon the removal of the gradient at room temperature, a very high permanent stress would appear as a result of the removal of such a high gradient. Instead of this, the physical adjustment of the glass to rate $R_2$ through viscous displacement of the glass above the annealing range is used to establish an instantaneously existing stress indicated by the line AB in FIG 4C by sharply reducing the cooling rate $R_2$ at time $t_x$. Because the change in rates is from a rapid to a slow rate, the induced stress is in the direction of increased center tension. Hence, the relaxation of the instantaneous stress during the relatively long time from $t_2$ to $t_3$ is in the direction of decreased center tension and thus is helpful in reducing the final permanent stress. Because the temperature of the glass is high within the annealing range, most of the induced stress relaxes during the time $t_2$ to $t_3$. Because the cooling rate $R_3$ is very low, the glass, in physically adjusting by stress relaxation to this rate of cooling, approaches its isothermal condition. Thus, if this cooling rate $R_3$ were continued through the annealing range, very little permanent stress would result in the glass at isothermal room temperature conditions. Of course, it would take a long time to cool the glass at such a low cooling rate. However, this condition of the glass in which the temperature gradient very closely approximates its isothermal condition can be essentially maintained and at the same time a substantial reduction in the annealing time can be effected over that which would be required to lower the temperature of the glass through the annealing range at rate $R_3$ by employing within the annealing range additional rapid cooling steps of such short time duration that the glass behaves during the rapid cooling steps essentially in an elastic manner. Therefore, the glass, for the very short period of time from $t_3$ to $t_y$, is again rapidly cooled at rate $R_4$, as by air impingement upon the surface of the glass. This change in cooling rate from $R_3$ to $R_4$ creates the instantaneously existing stress indicated by the line CD in FIG. 4C in the direction of increased center compression. A small amount of this stress relaxes, even in the short interval between times $t_3$ and $t_4$. This relaxation is in the direction which increases the final stress. When the rapid cooling rate $R_4$ is changed between times $t_y$ and $t_4$ to rate $R_5$ a change in the instantaneously existing stress E is produced in the direction of increased center tension, i.e., from E to F. The amount of stress, F, produced in the glass by the establishment of cooling rate $R_5$ is equivalent to a change from rate $R_3$ to rate $R_5$ (which ideally would be no change at all because rates $R_3$ and $R_5$ are approximately equal) plus the amount of stress which relaxed between times $t_3$ and $t_4$. It can be seen, then, from FIGS. 4A and 4C that the temperature of the glass has been reduced through a substantial portion of the annealing range during the short portion of the annealing time between times $t_3$ and $t_4$ at the expense of only the small increase in stress indicated at F over that indicated at C, and the temperature gradient to which the glass physically adjusts still approximates isothermal room temperature conditions. One or more additional steps as just described are made to lower the temperature of the glass through the annealing range. Of course, the rate at which the existing stresses relax diminishes with each successive cooling step because the temperature of the glass is decreasing. Therefore, the magnitude of the temperature drop of successive cooling steps should be slightly decreased to diminish the harmful relaxation of stress during rapid cooling steps, which relaxation, although small, can no longer be as effectively reduced during the lower cooling rate as at higher temperatures. In the manner just explained, the present invention provides a method of accomplishing the greatest portion of the total temperature drop through the annealing range in a very small portion of the annealing time and with very little total harmful stress relaxation. The majority of the annealing time is utilized to allow instantaneous stresses to relax toward a gradient closely approximating isothermal conditions. In essence, rapid cooling steps have been superimposed upon a base cooling rate which is very low—preferably approaching an isothermal condition of the glass—without substantially adding to the total permanent stress in the glass at equilibrium conditions characteristic of the base cooling rate. In this manner, a plate of glass may be cooled through the annealing range with the minimum amount of resulting stress possible for the time involved.

Turning now to FIGS. 5 and 6, the annealing schedule explained in connection with FIG. 1 is shown as applied to a process for drawing a continuous ribbon of glass 16 from a molten bath 17. As in conventional drawing apparatus, a drawing chamber 18 formed in part by L-blocks 19, ventilator water coolers 20, and cooled catch-pans 24 enclose an area above the bath and provide a suitable environment for the formation of the ribbon. Heat exchangers, such as water coolers 22, hasten the solidification or "setting" of the glass as the ribbon is drawn from the bath 17 by a series of pairs of drawing rolls 26 and conveyed to a cutting station (not shown) several floors above the bath. The molten glass forming the bath 17 is maintained at a temperature of about 1000 degrees centigrade, which is suitable for the drawing process. As the ribbon is formed and drawn through the drawing chamber and into the annealing lehr 30, which encloses that portion of the ribbon that is within the temperature limits of the annealing range, it is first cooled from the high temperature of the bath by water coolers 22, the ambient air within the drawing chamber 18, and the cooled catch pans 24. In this manner, the glass is cooled to a temperature of about 650 degrees centigrade by the time it leaves the drawing chamber. This much of the cooling cycle takes place above the upper temperature limit of the annealing range of the glass and is common to known processes and the process of the present invention.

FIG. 6 schematically indicates the surface temperatures of ribbons of three different thicknesses of glass, having identical means temperatures, relative to their positions in the drawing machine. The dotted-line curve indicates the temperature distribution of a glass ribbon drawn in the known manner wherein the ribbon cools at a natural rate characteristic of the machine as it is drawn through the machine. A glass ribbon allowed to cool in such a natural and substantially uncontrolled manner has been found to have an undesirable level of residual permanent stress and, as a result, the glass is difficult to cut. Any loss of glass through breakage in cutting operation is, of course, undesirable, and for this reason it is particularly important that an effective cooling schedule be established that is compatible with existing manufacturing processes.

The cooling curves indicated by the solid lines in FIG. 6 are achieved by first establishing an initial temperature gradient in the glass ribbon as it exits from the drawing chamber so as to rapidly cool the ribbon along cooling rate $R_1$ greater than the natural cooling rate from a temperature above the upper limit of the annealing range to a temperature within the annealing range. One method of accomplishing this is shown in FIGS. 5 and 6 where heat exchangers, such as water coolers 32, are located on each side of the ribbon at the entrance of the annealing lehr and cool by radiant cooling over a relatively wide band of the sheet measured in its direction of movement. These coolers are, in part, substantially parallel to and extend the width of the ribbon transversely of the direction of draw. They extend in the direction of draw a sufficient distance to lower the temperature of the glass through absorption of radiant heat to the proper break temperature at the proper time as optimized for the annealing time in a particular process. Air manifolds 33 are located adjacent the innermost portion of each cooler 32 and have their openings oriented to direct a relatively narrow stream of cooling air against the adjacent surface of the glass ribbon across the width thereof. The manifolds should extend across the glass ribbon over at least about 90 percent of the width thereof to assure an acceptably uniform stress distribution across the sheet. The remaining portion of the enclosed lehr may be insulated, as with sheets of insulating material 37, and may also be provided with heating elements 38 to provide flexibility in establishing the desired diminished cooling rate $R_3$. The heating elements 38 are preferably divided across the width of the sheet into three independently controlled sections. In this manner they can be adjusted to compensate for the unequal cooling which often occurs across the width of the sheet and which is most pronounced at the edges. In addition, the heaters, or groups thereof, may be independently controlled relative to the length of the lehr in the direction of ribbon travel so as to more accurately retard the cooling of the ribbon to a predetermined cooling rate. The terminal end of the lehr may include suitable means, such as cooling members 36 (FIG. 5) or doors 39 (FIG. 6), for opening the lehr to establish an increased cooling rate, such as $R_4$ in FIG. 6, at the terminal portion of the cooling curve within the annealing range.

As indicated in FIG. 6, the position relative to the drawing machine at which the glass is subjected to a rapid quench through air or other cooling gaseous fluid impingement remains constant regardless of glass thickness. This is possible, notwithstanding the slower drawing speeds used for thicker ribbons, because of the longer time necessary to cool thicker glass. Thus, while the time scale of the annealing curves for different glass thicknesses varies for any fixed distance on the machine, the position of the temperature changes remains substantially constant. Of course, while the distance for annealing may be regarded as a constant, regardless of glass thickness on any particular machine, this distance will vary on different types of drawing machines and with different arbitrarily selected annealing times.

FIG. 7 shows a suitable supply system for a pair of air manifolds 33 for use in the present invention. Where more than one pair of manifolds is desired, as in the second embodiment of the present invention, to be described, plural arrangements of the type shown in FIG. 7 are used and may be connected in parallel to a common air supply or, alternatively, may utilize separate air supplies.

As shown in FIG. 7, the pair of manifolds 33 receives air from a common air supply 50. Air is piped first from the source through a main air line 51 equipped with a filter 52, a pressure regulator 54, a gate valve 56, and a pressure gauge 58. Two main feed lines 59 and 60 divide the flow from the main air line 51 to supply each manifold with equal air pressure. As more clearly shown in FIG. 8 of the drawings, the manifolds are divided into three sections, as by air blocks 62 and 64. Section feed lines 65, 67 and 69 supply the individual sections of one of the manifolds from main feed line 59, and section feed lines 66, 68 and 70 supply the sections of the other manifold of the pair from main feed line 60. Each section feed line includes a stopcock 72, a needle valve 74 for fine air flow adjustment, and a pressure gauge 76, and allows the air flow and hence the cooling to be varied across the width of the ribbon. The two end sections of each manifold are supplied through an opening at each end of the pipe. The center section is supplied through a center tap 77 in the middle of the pipe. A baffle member 78 is placed within the pipe and directly opposite the opening of the center tap to prevent the air entering the pipe from passing directly through the outlet holes 46 which are in alignment with the inlet opening. As shown in FIGS. 8 and 9, outlet holes 46 are closely spaced and extend along the length of that portion of each manifold which faces the glass ribbon. The manifolds are preferably adjusted about their longitudinal axes so as to direct the flow of air from the outlets 46 at approximately a 20-degree angle upwardly from the horizontal toward the glass ribbon. Preferably, the manifolds are spaced approximately three inches from the major surfaces of the glass.

The present annealing schedules, being primarily applicable to what is known in the industry as "flat glass," i.e., glass sheets, plates and other glass products having essentially parallel major surfaces and including bent or curved sheets or plates, may be expressed in terms of the temperature of the glass at a particular plane in the glass, such as the midplane or surface of the glass, or may be expressed in terms of the mean temperature of the glass. These temperatures vary from each other at any given time to the extent that a temperature gradient exists through the thickness of the glass. The mean temperature may be calculated from the measured surface temperatures, the thickness, heat transfer characteristics, and the rate of cooling of the glass, in accordance with the following equation:

Means temperature = surface temperature + $L^2R/12\alpha$ where L is the thickness of the glass plate in centimeters, R is the cooling rate in °C./sec., and $\alpha$ is the thermal diffusivity in cm.$^2$/sec. and is equal to $k/c\rho$; where $c\rho$ is the volumetric specific heat in cal./cm.$^3$·°C., and $k$ is the effective thermal conductivity in cal./cm.·°C./sec.

Due to the various actual temperatures which may exist within the glass at any one time, the indicated temperature, because of the difficulty in measuring glass temperatures at a particular plane in the glass, will often vary with different methods of measurement. Therefore, it is to be understood that the temperatures specified herein, unless otherwise indicated, are surface temperatures of the glass directly measurable and which would be recorded from the signal output of radiation pyrometers which are filtered to accept radiation from only one surface of the glass and which are mounted at the distance from the surface of the glass being measured for which they are calibrated.

With respect to the temperature limits of the annealing range of a glass of any given composition, it is preferable to designate the range in terms of the mean temperature of the glass, which range is then applicable to all thickness and is independent of the particular gradient in the glass as it passes through the upper or lower limit thereof. These limits are capable of practical determination by comparing stress in a glass sample cooled at a constant cooling rate through a temperature range which clearly encompasses the annealing range, with the stress in various samples cooled at two cooling rates, one of which is the same as the constant cooling rate of the first sample. As long as the change in cooling rates occurs above or below the limits of the annealing range and the constant cooling rate is equivalent to that of the first sample is maintained through the annealing range, the resultant stress will remain the same. Once the change in temperature occurs within the annealing range, the resultant stress will change because the cooling schedule through the annealing range will no longer be a single constant rate. Hence, if the temperature at which the cooling rates are changed is varied, the limits of the annealing range will manifest themselves by a change in resultant stress because of the appearance of the break temperature within that temperature range which affects the final stress. In general, the annealing range of typical soda-lime-silica sheet and plate glass for annealing schedules of a time magnitude contemplated in the examples set forth herein (i.e., on the order of 100 seconds for 7/32-inch thick glass) is approximately 600 to 520 degrees centigrade. This refers to the mean temperature of the glass. For purposes of control, it is convenient to determine this mean temperature from measurement of surface temperature which will be invariably lower. For example, for 7/32-inch thick glass, the surface temperature, while the glass is in the annealing range, will extend from between about 595 and 585 degrees centigrade to between about 510 and 500 degrees centigrade. For any thickness of glass, the surface temperature observed while the glass is within the annealing range should vary as indicated by the above equation, and remains roughly in the range of 600 to 500 degrees centigrade. Variations in the composition of the glass can, of course, raise or lower the annealing range.

The resultant stress in glass, as referred to herein, is expressed in terms of millimicrons (m$\mu$) per inch of glass. This unit of measure expresses the path difference formed between two plane-polarized light waves passing through stressed glass, which path difference is caused by the birefracting effect produced by stress in glass. The extent of such birefringence, as measured by the path difference of the waves expressed in millimicrons, m$\mu$, per inch of glass thickness, is proportional to the intensity of the stress and thus serves as a direct measure thereof. In practice, the stress is measured as follows: Light polarized by means of a Nicol prism is passed through a one-inch path in the glass being measured (i.e., through the edge, normal to the plane of stress variation, of a one-inch sample oriented at an angle of 45 degrees to the plane of polarization of the light) and then through an analyzer consisting of another Nicol prism having a plane of polarization at right angles to that of the polarizer. A calibrated wedge placed between the Nicol prisms and adjusted until it compensates for the difference in light paths then provides a direct measurement of the center tension or the corresponding central birefringence, as measured by the path difference of the polarized light waves per inch of glass.

The following is an example, by way of illustration only, of a preferred mode of manufacturing sheet glass utilizing the embodiment of the present invention in which a water cooler and a pair of air manifolds cool the ribbon during the first portion of the annealing range to obtain a low resultant stress in the final product:

A ribbon of glass approximately 100 inches wide and 7/32 inch thick is continuously formed by being mechanically drawn from a partially enclosed bath of molten glass maintained at a temperature of approximately 1000 degrees centigrade and consisting of:

| | Percent by weight |
|---|---|
| $SiO_2$ | 71.38 |
| $Na_2O$ | 12.79 |
| CaO | 9.67 |
| MgO | 4.33 |
| $Na_2SO_4$ | 0.75 |
| NaCl | 0.12 |
| $Fe_2O_3$ | 0.15 |
| $Al_2O_3$ | 0.81 |

The ribbon, formed and drawn upwardly by the traction of pairs of opposed drawing rolls acting upon the already formed portion of the ribbon, first passes between a pair of vertically disposed heat exchangers within the drawing chamber which remove heat from the ribbon and drawing chamber at a rate of approximately 8640 British thermal units per minute. In addition, the ventilator coolers, in part forming the drawing chamber, remove heat from the ribbon and drawing chamber at a rate of approximately 1970 British thermal units per minute. As the ribbon travels upwardly and the portion thereof being considered leaves the drawing chamber, catch pan coolers on each side of the ribbon at the exit end of the drawing chamber remove heat from the ribbon and drawing chamber at the rate of approximately 12,600 British thermal units per minute. In this manner, the temperature of the glass ribbon is reduced to approximately 635 degrees centigrade at it leaves the drawing chamber. Another pair of coolers, one cooler on each side of the ribbon and located just above the drawing chamber within the enclosed portion of the drawing machine, withdraws heat from the ribbon at a rate of approximately 1200 British thermal units per minute by a continuous flow of water circulated through the coolers transversely of the ribbon travel to lower the temperature of the ribbon at a substantially constant and increased rate over the natural cooling rate from 635 to 570 degrees centigrade measured surface temperature in approximately 33 seconds from the time the ribbon enters the enclosed portion of the machine above the drawing chamber. At this point, air impinged upon the glass ribbon on each side thereof in the form of a strip approximately 1 to 2 inches wide across the width of the ribbon. The air is supplied from a pair of manifolds, one on each side of the ribbon approximately 3 inches from each side of the ribbon surfaces and extending across the width thereof transversely to the direction of ribbon travel. Each manifold is formed of a 90-inch long stainless steel pipe having an inside diameter of 1½ inches and is divided into three 30-inch sections along the length thereof. Three hundred and thirty-seven outlet holes approximately 1/10 inch in diameter on centers spaced ¼ inch apart are formed in a straight line along the longitudinal axis of the pipe forming the manifold. The outlet holes are so positioned as to direct the flow of air upwardly in the direction of the ribbon travel approximately 20 degrees from the horizontal. Air is supplied to each manifold at a temperature of approximately 30 degrees centigrate and at a flow rate of approximately 210 cubic feet per minute at approximately 10 pounds per square inch gage pressure and, through impingement of the air upon the surfaces of the glass ribbon, heat is extracted therefrom at a rate of approximately 1640 British thermal units per minute so as to lower the temperature of the ribbon from approximately 570 degrees centigrade to 555 degrees centigrade in approximately 3 seconds. For the next approximately 68 seconds, the cooling of the ribbon is retarded from its natural cooling rate by insulation and heating elements positioned within the enclosed portion of the drawing machine, and in this time the ribbon is cooled to a temperature of approximately 540 degrees centigrade. For this purpose, the heating elements are divided into three vertical zones, as indicated in FIG. 6 of the drawings. Electrical power is distributed in the amounts of 400 watts to the first zone, 300 watts to the second, and 200 watts to the third to retard the cooling rate of the ribbon. In the next approximately 20 seconds, the cooling rate of the ribbon is increased above the natural cooling rate by opening the sides of the machine so as to lower the temperature of the ribbon to approximately 505 degrees centigrade. The annealing range of the glass, for this example, is taken to be about 600 to 520 degrees centigrade mean temperature. This corresponds to a range in terms of the surface temperature of the glass of about 588 to 505 degrees centigrade. The ribbon is cooled through this temperature range in approximately 100 seconds. After the temperature of the ribbon reaches the lower limit of the annealing range, the ribbon is then allowed to cool at a natural rate as it is drawn to the cut-off floor approximately 15 feet above the enclosed portion of the drawing machine, at which point it is at a temperature of approximately 90 degrees centigrade, and is cut into discrete sheets. The central birefringence of glass annealed in this manner, as indicated by the path difference formed between two plane-polarized light waves passing through the glass measured in the manner previously explained, is approximately 100 to 110 millimicrons per inch. By way of comparison, similar ribbons of glass drawn through the same machine but allowed to cool naturally (i.e., without the use of water coolers, air manifolds and heaters above the drawing chamber), have resulting stresses in the range of 220 to 250 millimicrons per inch.

Under various operating conditions, of course, the observed annealing range and break tempertaure might well vary from the temperatures of the examples, used only for purposes of illustration, due both to machine and operating factors as well as to variations in the time of anneal. The primary applicability of the disclosed annealing schedules, from a commercial standpoint, is to processes where the time available for annealing is less than ten minutes and usually between one-half to five minutes. With respect to glass drawing machines, it must be emphasized that no two machines are identical, and the slight differences in surroundings, machine position relative to the melting tank, etc., have a pronounced effect upon the operation of each machine.

In general, it is believed that, for best reduction of residual permanent stress when using only one pair of air manifolds, as in the first embodiment of this invention, the air or other inert gaseous fluid should be impinged upon the surfaces of the glass when the temperature of the ribbon is within 10 to 55 percent of the annealing range (measured from the top thereof and considering the bottom of the range to be 100 percent thereof). As applied to soda-lime-silica glass of the thickness and type mentioned in the example and for annealing times therein contemplated, this corresponds to between about 580 and 545 degrees centigrade. The temperature of the glass should be rapidly lowered approximately 5 to 25 degrees centigrade. The temperature of the air or other gaseous fluid, as long as it is lower than that of the glass, is a continuous variable, provided the quantity of gas used is also varied to maintain the heat extraction at a level which allows the attainment of the requisite rapid cooling. From a practical standpoint, it is believed that the temperature of the air or other gaseous fluid supplied to the manifolds should be between 5 and 65 degrees centigrade. The time duration of the rapid cooling rate should be on the order of one-half the time necessary to establish a steady-state gradient through the glass thickness and, in any event, no more than approximately five seconds so as to prevent substantial stress relaxation. This cooling rate should be relatively great, having a slope of not less than about 2 degrees centigrade per second nor more than about 25 degrees centigrade per second, and most usually will be between 5 and 10 degrees centigrade per second. This slope is the difference between the equilibrium temperature of the glass at the start of the rapid cooling and the equilibrium temperature immediately after the rapid cooling, divided by the time lapse. Where the reduced cooling rate which follows the rapid fluid cooling is to be changed to an increased terminal cooling rate, this change in rate should occur at the same or at a lower temperature than the temperature of the glass after the air quench and between 40 to 90 percent of the annealing range. For soda-lime-silica glass, this corresponds to between 560 and 515 degrees centigrade. The average slope of the reduced cooling rate should not exceed 0.65 degree centigrade per one percent of the total time of anneal (e.g., if the temperature drop during the reduced cooling rate $R_3$ of FIG. 6 is 15 degrees centigrade and the time during which the glass is cooled through this temperature drop is 68 seconds of a total annealing time of 100 seconds—i.e., 68 percent—the average slope is 0.22 degree centigrade per one percent of total time of anneal).

FIG. 10 illustrates a drawing machine modified in accordance with the present invention to produce the three-step annealing curve as shown in FIG. 4. The basic drawing apparatus is essentially the same as that shown in FIG. 5 in conjunction with the first embodiment. Thus, a drawing chamber 180 is formed in part by L-blocks 190, ventilator water coolers 200 and cooled catch pans 240, and encloses an area above the molten bath 170 to provide a suitable environment for the formation of the ribbon. Water coolers 220 hasten the solidification of the glass as the ribbon is drawn from the bath 170 by the series of pairs of drawing rolls 260 and conveyed to a cutting station (not shown) several floors above the bath. As in the embodiment of FIG. 5, the glass enters the annealing lehr 300 which encloses that portion of the ribbon that is within the temperature limits of the annealing range, at a temperature of about 635 degrees centigrade.

FIG. 11 schematically indicates the surface temperatures of three different thicknesses of ribbons, having identical mean temperatures, relative to their position in the drawing machine. The dotted-line curve indicates the temperature distribution of a glass ribbon drawn in the known manner wherein the ribbon cools at a natural rate as it is drawn through the machine. As explained in connection with the cooling schedule of FIG. 6, a glass ribbon allowed to cool in a natural and substantially uncontrolled manner has been found to have an unacceptable level of residual permanent stress and, as a result, the glass is difficult to cut.

The cooling curves indicated by the solid lines in FIG. 11 are achieved by modifying the natural cooling rate by impinging air upon both major surfaces of the ribbon at a plurality of spaced positions across the width of the ribbon. As shown by the graph, the temperature of the ribbon approaches the upper limit of the annealing range along a temperature curve which approximates the natural cooling curve. The cooling rate of the ribbon is first changed at the proper break temperature $T_{B_1}$ established by the position of the first pair of manifolds 45 through the impingement of air or other cooling gaseous fluid flowing from the openings therein which direct the flow in a narrow path across the width of the moving ribbon. The normal ribbon travel removes the portion of the glass being quenched from the flow of cooling fluid before the stress induced by the change in cooling rates undergoes substantial relaxation. The time duration of this rapid cooling, relative to any one point or line across the width of the ribbon, varies with the drawing speed but is generally on the order of one to three seconds. Because it takes more time to establish a gradient through a thicker ribbon, the longer time of air impingement due to the slower drawing speed has no harmful effect and, in fact, is a compensating factor which allows the same manifold structure and hence width of the band of air to be used for all standard ribbon thicknesses.

The successive pairs of manifolds 45, 47 and 49 are constructed and supplied with air or other gaseous fluid in the same manner as explained in connection with manifolds 33 and shown in FIGS. 7–9. They are spaced from and supported by the lehr enclosure, as by brackets 44 or other suitable mounting means.

Between the first pair of manifolds 45 and the second pair 47, the cooling rate of the glass ribbon is retarded by insulating material 48 fastened to the inside of the enclosure 300. Similarly, the space along each side of the enclosure 300 between the second pair of manifolds 47 and third pair 48 is insulated, as is the remaining portion of the enclosure after the third pair of manifolds. In this manner, successive steps in the cooling curve may be established, as shown in FIG. 11. Of course, heating elements, such as those shown in connection with the embodiment of FIG. 5, may be used if additional flexibility of control is desired.

In a manner similar to that explained in connection with FIG. 6, the physical position of the pairs of manifolds 45, 47 and 49 remains constant, as does the length of the annealing lehr, regardless of the variation in time for the ribbons of different thicknesses to travel the distance. As portions of the ribbon leave the enclosure their cooling rate is no longer critical from the standpoint of the final permanent stress, and the ribbon is allowed to cool naturally.

The following is an example, by way of illustration only, of a preferred mode of manufacturing sheet glass utilizing the embodiment of the present invention in which three pairs of air manifolds provide a three-step annealing curve to obtain a low resultant stress in the final product:

A ribbon of glass approximately 100 inches wide and $\frac{7}{32}$-inch thick is continuously formed by being mechanically drawn from a partially enclosed bath of molten glass maintained at a temperature of approximately 1000 degrees centigrade and consisting of:

| | Percent by weight |
|---|---|
| $SiO_2$ | 71.38 |
| $Na_2O$ | 12.79 |
| $CaO$ | 9.67 |
| $MgO$ | 4.33 |
| $Na_2SO_4$ | 0.75 |
| $NaCl$ | 0.12 |
| $Fe_2O_3$ | 0.15 |

The ribbon, formed and drawn upwardly by the traction of pairs of opposed drawing rolls acting upon the already formed portion of the ribbon, first passes between a pair of vertically disposed heat exchangers within the drawing chamber which remove heat from the ribbon at a rate of approximately 8640 British thermal units per minute. In addition, the ventilator coolers, in part forming the drawing chamber, remove heat from the ribbon and drawing chamber at a rate of approximately 1970 British thermal units per minute. As the ribbon travels upwardly and the portion thereof being considered leaves the drawing chamber, catch pan coolers on each side of the ribbon at the exit end of the drawing chamber remove heat from the ribbon and drawing chamber at the rate of approximately 12,600 British thermal units per minute. In this manner, the temperature of the glass ribbon is reduced to approximately 635 degrees centigrade as it leaves the drawing chamber. The ribbon continues to cool at approximately a natural rate to a temperature of about 590 degrees centigrade measured surface temperature in the first approximately 28 seconds from the time the ribbon entered the enclosed portion of the drawing machine above the drawing chamber. At this point, air is impinged upon the glass ribbon on each side thereof in the form of a 1 to 2 inch strip across the width of the ribbon. The air is supplied from a pair of manifolds, one on each side of the ribbon approximately 3 inches from each side of the ribbon surfaces and extending across the width thereof transversely to the direction of ribbon travel. Each manifold of the first and succeeding pairs of manifolds is formed of a 90-inch long stainless steel pipe having an inside diameter of 1½ inches and is divided into three 30-inch sections along the length thereof. Three hundred and thirty-seven outlet holes approximately 1/10 inch in diameter on centers spaced ¼ inch apart are formed in a straight line along the longitudinal axis of the pipe forming the manifold. The outlet holes are so arranged as to direct the flow of air upwardly in the direction of the ribbon travel approximately 20 degrees from the horizontal. Air is supplied to the first pair of manifolds at a temperature of approximately 30 degrees centigrade and at a flow of about 110 to 130 cubic feet per minute at approximately 10 pounds per square inch gage pressure. By impingement of the air upon the surfaces of the glass ribbon, heat is extracted therefrom at a rate of approximately 1870 British thermal units per minute so as to lower the temperature of the ribbon from approximately 590 degrees centigrade to 572 degrees centigrade in approximately 3 seconds. For the next approximately 22 seconds, the cooling of the ribbon is retarded from its natural cooling rate by insulation within the enclosed portion of the drawing machine and reaches a temperature of 564 degrees centigrade. In the next approximately 3 seconds, the ribbon is again cooled by air impingement from a second pair of manifolds of the same construction as the first pair. Air is supplied to this pair at a temperature of approximately 30 degrees centigrade and at a flow rate of about 100 to 120 cubic feet per minute at approximately 10 pounds per square inch gage pressure. Impingement of this air upon the surfaces of the glass ribbon extracts heat therefrom at a rate of approximately 1760 British thermal units per minute so as to lower the temperature of the ribbon from approximately 564 degrees centigrade to 548 degrees centigrade. For the next approximately 22 seconds, the cooling of the ribbon is again retarded from its natural cooling rate by insulation within the drawing machine and at this time the ribbon cools to a temperature of 540 degrees centigrade. In the next approximately 3 seconds, the ribbon is again cooled by air impingement in the same manner as the previous two steps but with a flow rate of 80 to 90 cubic feet per minute and an extraction of heat at a rate of approximately 1100 British thermal units per minute. In this manner, the temperature is lowered to 530 degrees centigrade and the cooling rate is thereafter retarded for about the next 47 seconds, at which time the temperature of the ribbon will be 505 degrees centigrade and will pass through the lower limit of the annealing range. The annealing range of the glass for this example, in terms of the mean temperature, is taken to be 600 to 520 degrees centigrade. This corresponds to a range, in terms of surface temperature of the glass, of about 588 to 505 degrees centigrade. The ribbon is cooled through this temperature range in approximately 100 seconds. After the temperature of the ribbon reaches the lower limit of the annealing range, the ribbon is allowed to cool at a natural rate as it is drawn to the cut-off floor, approximately 15 feet above the enclosed portion of the drawing machine, at which point it is at a temperature of approximately 90 degrees centigrade, and is cut into discrete sheets. The central birefringence of a 7/32-inch thick glass sheet annealed in this manner, as indicated by the path difference formed between two plane-polarized light waves passing through the glass measured in the manner previously explained, is calculated to be approximately 90 to 100 millimicrons per inch.

By way of comparison, similar ribbons of glass drawn through the same machine allowed to cool naturally (i.e., without the use of air impinged upon the glass surfaces at spaced positions) have resulting stresses in the range of 220 to 250 millimicrons per inch.

As explained in connection with the first embodiment, the observed annealing range and break temperatures of the cooling curve of the second embodiment might well vary under various operating conditions from the temperatures of the examples, which have been used only for purposes of illustration.

In general, it is believed that at least two rapid cooling steps should be used to lower the temperature of the glass through the annealing range, in accordance with an annealing schedule of the second embodiment of this invention, and that the temperature of the cooling air or other inert gaseous fluid should be between about 5 and 65 degrees centigrade. This cooling rate of each rapid cooling step should be relatively great, and, as in the first embodiment, should have a slope of not less than about 2 degrees centigrade per second, preferably between 5 and 10 degrees centigrade per second, and generally no greater than 25 degrees centigrade per second. As in the first embodiment, the temperature drop from such cooling should be between about 5 and 25 degrees centigrade. The time between each rapid cooling step should be at least about five times as long as the rapid cooling step itself to allow adequate relaxation of any stress which appears upon removal of the rapid cooling rate as a result of viscous flow during such rapid cooling. The rates of cooling in the intervals between rapid cooling steps should be relatively low so as to approach the isothermal condition in the glass, and in any event the average slope of these cooling rates should not exceed about 0.6 degree centigrade per percent of total time of anneal. The time duration of the rapid cooling rates should be on the order of one-half the time necessary to establish a steady-state gradient through the glass thickness and, in any event, no more than approximately five seconds so as to prevent substantial stress relaxation.

FIGS. 12 and 13 schematically show typical horizontal annealing lehrs for annealing continuously rolled ribbons of glass.

In FIG. 12 the ribbon 80 is first formed in a conventional manner by forming rolls 81 and 82 from a molten bath of glass 84 in a tank 85, then conveyed down the apron rolls 86 leading from the tank and thence into the lehr 88. As the ribbon enters the lehr, coolers 90 within the lehr on each side of the ribbon establish an initial cooling rate to then lower the temperature across the width of the ribbon at a substantially constant rate to the temperature within the annealing range. Air manifolds 92 on each side of the ribbon extending across the width thereof transversely to the ribbon travel and located adjacent the innermost portion of the cooling members 90 normally cool the ribbon at a rapid rate. Insulation 94 and, if desired, heating elements 95 on each side of the ribbon within the lehr 88 thereafter retard the cooling rate as the ribbon is conveyed through the horizontal annealing lehr on rollers 96 until the temperature of the ribbon has been lowered to a second break point in the annealing range. At this point openings in the lehr, such as doors 98, or cooling members (not shown) such as those at the entrance of the lehr, establish a more rapid cooling rate and lower the temperature of the glass below the annealing range. In this manner the cooling curve of the first embodiment of the present invention may be applied to a standard glass ribbon rolling operation.

FIG. 13, similarly to FIG. 12, shows a ribbon 800 formed in a conventional manner by forming rolls 810 and 820 from a molten bath of glass 840 in a tank 850 and then conveyed down the apron rolls 860 and into the lehr 880. Three pairs of air manifolds 100, 102 and 104 extend across the with of the lehr transversely of and at spaced intervals along the ribbon travel. As the ribbon passes between the first pair of air manifolds 100, it is cooled at a rapid rate and the temperature of the ribbon is lowered to within the annealing range. Insulation 106 thereafter retards the cooling of the ribbon until the second pair of air manifolds 102 are reached, at which point the ribbon is again rapidly cooled for a short time interval. In this manner, successive steps of rapid cooling are impressed upon thte glass, three such steps in the embodiment shown in FIG. 13, so as to lower the temperature of the rolled ribbon through the annealing range in a manner similar to that explained in connection with the second embodiment of the invention as applied to a glass drawing operation.

FIGS. 14 and 15 schematically show typical horizontal annealing lehrs for annealing glass sheets or plates (such as sheets which are heated above the annealing range to an essentially stress-free condition for the purpose of bending) in accordance with this invention.

In FIG. 14, glass sheets or plates 110 are conveyed through a horizontal lehr 112 on conveying means such as rollers 114. Heating elements 116 within the initial portion of the lehr on each side of the conveying means raise the temperature of the glass above the annealing range. After the glass has been heated to a temperature sufficient to allow the internal stresses to quickly relax, it passes between coolers 118 extending across the width of the glass inside the lehr. The temperature of the glass is thus lowered at a substantially constant rate to a temperature within the annealing range. The glass is then rapidly cooled for a very short period of time as air is impinged upon the surfaces of the glass from air manifolds 120 positioned on each side of the conveying means and extending across the width of the lehr transversely of the glass travel. Insulation 122 and, if desired, heating elements 124 thereafter establish a reduced, substantially constant cooling rate until the temperature of the glass has been lowered to a point near the lower limit of the annealing range, after which the glass is cooled more rapidly to the lower limit of the annealing range by providing openings in the lehr or by additional coolers (not shown) similar to those in the initial portion of the lehr.

FIG. 15, similarly to FIG. 14, shows a horizontal lehr 212 through which glass sheets or plates 210 are conveyed by means such as rollers 214. Heating elements 216 at the entrance of the lehr raise the temperature of the glass sufficient to allow internal stresses to quickly relax. Heat deflectors 125 isolate this initial portion of the lehr from the cooling section wherein the glass is rapidly cooled for a short period of time from a temperature above the annealing range to a temperature within the annealing range by impingement of air from a first pair of air manifolds 126 extending across the width of the lehr transversely of the glass travel and on opposite sides of the conveying means. Successive pairs of air manifolds 128 and 130 establish additional rapid cooling steps and insulation 132 retards the cooling rate of the glass between and after the pairs of manifolds. In this manner, successive steps of rapid cooling are impressed upon the glass, three such steps in the embodiment shown in FIG. 15, so as to lower the temperature of the glass sheets or plates through the annealing range in a manner similar to that explained in connection with the second embodiment of the invention as applied to a glass drawing operation.

The annealing of glass in the manner disclosed herein will result in a final anneal lower than the minimum anneal obtainable by any heretofore known annealing schedule in a comparable annealing time. In addition, an improved result is obtained without the expense of maintaining the glass at an elevated temperature over a substantial portion of the cooling cycle and without the difficulties inherent in following curves having continuously changing cooling rates.

It should be understood that the foregoing disclosure is intended to cover all changes and modifications of the examples of the invention herein chosen for the purposes of the disclosure which do not constitute departures from the spirit and scope of the invention as set forth in the appended claims:

I claim:

1. In a method of annealing glass in which the glass is cooled at a substantially constant rate from at least a temperature at the upper limit of the annealing range to a temperature within the annealing range and thereafter cooled at an average lower rate at least until the temperature of the glass reaches the lower limit of the annealing range, the improvement which comprises applying a momentary gaseous quench to the surfaces of the glass when the rate of cooling is changed from the said first rate to the said lower rate.

2. A method of annealing a continuous ribbon of glass which, at its hottest portion, is at a temperature above the upper limit of the annealing range of the glass and which, at its coolest portion, is at a temperature below the limit of the annealing range of the glass comprising moving the ribbon of glass along a predetermined path, enclosing the portion of the ribbon which is at temperatures within the annealing range of the glass, absorbing heat from that portion of the enclosed ribbon which is at temperatures near the upper portion of the annealing range so as to lower the temperature of the glass to a temperature intermediate the annealing range, thereupon impinging a cooling gas against the major surfaces of the ribbon along substantially line contact transversely of the direction of movement of the ribbon, and thereafter retarding the cooling of the ribbon until the lower temperature limit of the annealing range is reached.

3. A method of annealing a continuous ribbon of glass which, at its hottest portion, is at a temperature above the upper limit of the annealing range of the glass and which, at its coolest portion, is at a temperature below the lower limit of the annealing range of the glass comprising moving the ribbon of glass along a predetermined path, enclosing the portion of the ribbon which is at temperatures within the annealing range of the glass, absorbing heat from that portion of the enclosed ribbon which is at temperatures near the upper portion of the annealing range so as to lower the temperature of the glass to a temperature intermediate the annealing range, thereupon impinging a cooling gas against the major surfaces of the ribbon along substantially line contact transversely of the direction of movement of the ribbon, then retarding the cooling rate of the ribbon to less than the normal cooling rate of the ribbon and thereafter cooling the ribbon at a rate greater than the normal cooling rate of the ribbon, at least until the temperature of the ribbon reaches the lower temperature limit of the annealing range.

4. A method of cooling glass through an annealing range having an upper temperature limit between about 595 and 585 degrees centigrade and a lower limit between about 510 and 500 degrees centigrade, based on surface temperatures of the glass, which comprises cooling the glass through the temperature limits of the annealing range by cooling the glass at a first rate to a surface temperature within the range of about 580 to 545 degrees centigrade, thereupon impinging gaseous fluid upon the surfaces of the glass being annealed so as to rapidly lower the temperature of the glass approximately 5 to 25 degrees centigrade, then retarding the cooling of the glass until the surface temperature of the glass is below that temperature to which the glass was lowered by the gaseous fluid impingement and within the range of about 560 to 515 degrees centigrade, and thereupon cooling the glass at an increased rate until the temperature of the glass reaches the lower limit of the annealing range.

5. In a method of drawing and annealing a continuous ribbon of glass, the steps comprising drawing a continuous ribbon of glass from a molten bath, conveying the formed ribbon through a drawing machine first past radiant heat absorbers and then through an impinging curtain of gaseous cooling fluid of a thickness such that the fluid rapidly cools the glass surface, but the mean temperature of the glass remains in the annealing range the duration of passage of said ribbon through said curtain not substantially above 5 seconds and then cooling the glass through the balance of the annealing range at a lower rate than the rate of cooling during passage of the glass through said curtain.

6. In a method of drawing and annealing a continuous ribbon of glass, the steps comprising drawing a continuous ribbon of glass from a molten bath, conveying the formed ribbon through a drawing machine first past radiant heat absorbers and then through an impinging curtain of gaseous cooling fluid of a thickness such that the fluid rapidly cools the glass surface, but the mean temperature of the glass remains in the annealing range, the duration of passage of said ribbon through said curtain not substantially above 5 seconds then continuing cooling the glass at a lower rate than the rate of cooling during passage of the glass through said curtain while in the annealing range and then conveying the ribbon through a subsequent impinging curtain of gaseous cooling fluid of a thickness such that the fluid rapidly cools the glass surface but the mean temperature of the glass remains in the annealing range the duration of passage of said ribbon through said curtain not substantially above 5 seconds and then cooling the glass through the balance of the annealing range at a lower rate than the rate of cooling during passage of the glass through said curtain.

7. The method of claim 5 wherein the ribbon is further cooled after the second passage through the impinging curtain of gaseous cooling fluid and drawn through a third subsequent impinging curtain of gaseous cooling fluid of a thickness such that the fluid rapidly cools the glass surface, but the mean temperature of the glass remains in the annealing range the duration of the passage of said ribbon through said curtain not substantially above 5 seconds and then cooling the glass through the balance of the annealing range at a lower rate than the rate of cooling during passage of the glass through said curtain.

References Cited by the Examiner

UNITED STATES PATENTS

| 1,585,542 | 5/1926 | Henry | 65—117 |
| 2,144,320 | 1/1939 | Bailey | 65—349 |
| 2,725,679 | 12/1955 | Long | 65—348 |

FOREIGN PATENTS

| 588,922 | 12/1959 | Canada. |

OTHER REFERENCES

Textbook of Glass Technology by Hodkin & Cousen, 1925, p. 48.

DONALL H. SYLVESTER, *Primary Examiner.*

D. CRUPAIN, *Assistant Examiner.*